US009842501B2

(12) United States Patent
Osagawa

(10) Patent No.: US 9,842,501 B2
(45) Date of Patent: Dec. 12, 2017

(54) MINE MANAGEMENT SYSTEM

(71) Applicant: Komatsu Ltd., Tokyo (JP)

(72) Inventor: Kenta Osagawa, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/894,959

(22) PCT Filed: Aug. 31, 2015

(86) PCT No.: PCT/JP2015/074812
§ 371 (c)(1),
(2) Date: Nov. 30, 2015

(87) PCT Pub. No.: WO2016/013687
PCT Pub. Date: Jan. 28, 2016

(65) Prior Publication Data
US 2017/0061796 A1    Mar. 2, 2017

(51) Int. Cl.
*G08G 1/16* (2006.01)
*G08B 29/18* (2006.01)
*G05D 1/02* (2006.01)

(52) U.S. Cl.
CPC ........... *G08G 1/163* (2013.01); *G05D 1/0289* (2013.01); *G08B 29/185* (2013.01); *G08G 1/166* (2013.01)

(58) Field of Classification Search
None
See application file for complete search history.

(56) References Cited

U.S. PATENT DOCUMENTS

| 6,246,932 B1 | 6/2001 | Kageyama et al. |
| 6,393,362 B1 | 5/2002 | Burns |

(Continued)

FOREIGN PATENT DOCUMENTS

| CA | 2889652 A1 | 3/2015 |
| CN | 101277863 A | 10/2008 |

(Continued)

OTHER PUBLICATIONS

Office Action dated Feb. 11, 2016, issued for the Australian patent application No. 2015261658.
(Continued)

*Primary Examiner* — Adolf Dsouza
(74) *Attorney, Agent, or Firm* — Locke Lord LLP; Howard M. Gitten

(57) ABSTRACT

A mine management system includes generating unmanned vehicle traveling data including a target traveling route of an unmanned vehicle, acquiring unmanned vehicle current situation data at first time point, acquiring manned vehicle current situation data at the first time point, estimating a range in which the unmanned vehicle may be present at second time point based on the unmanned vehicle traveling data and the unmanned vehicle current situation data, estimating a position where a manned vehicle may be present at the second time point based on the manned vehicle current situation data, and deriving a risk level indicating a possibility of collision between the manned vehicle and the unmanned vehicle corresponding to the second time point at the first time point per position where the manned vehicle may be present based on estimation results of estimating the unmanned vehicle existence range and the manned vehicle existence position.

18 Claims, 12 Drawing Sheets

(56) References Cited

U.S. PATENT DOCUMENTS

| | | |
|---|---|---|
| 6,625,540 B2 | 9/2003 | Kageyama |
| 6,681,157 B2 | 1/2004 | Kageyama |
| 6,859,731 B2 | 2/2005 | Takafuji et al. |
| 7,831,345 B2 | 11/2010 | Heino et al. |
| 8,606,495 B2 | 12/2013 | Makela et al. |
| 8,840,190 B2 | 9/2014 | Stokes |
| 8,965,622 B2 | 2/2015 | Ozaki et al. |
| 9,415,722 B2 | 8/2016 | Masutani et al. |
| 2001/0044697 A1 | 11/2001 | Kageyama |
| 2002/0165645 A1* | 11/2002 | Kageyama ............ B60W 40/04 701/1 |
| 2009/0118889 A1 | 5/2009 | Heino et al. |
| 2012/0001474 A1 | 1/2012 | Stokes |
| 2012/0296495 A1 | 11/2012 | Ozaki et al. |
| 2013/0060458 A1 | 3/2013 | Makela et al. |
| 2015/0048668 A1 | 2/2015 | Stokes |
| 2016/0016512 A1 | 1/2016 | Masutani et al. |

FOREIGN PATENT DOCUMENTS

| | | |
|---|---|---|
| CN | 102245858 A | 11/2011 |
| CN | 102725704 A | 10/2012 |
| CN | 102893176 A | 1/2013 |
| CN | 103827942 A | 5/2014 |
| JP | 2000-339029 | 12/2000 |
| JP | 2000-339029 A | 12/2000 |
| JP | 2003-205804 | 7/2003 |
| JP | 2015-085798 A | 5/2015 |
| WO | WO-98/37468 A1 | 8/1998 |
| WO | WO-2011/130861 A1 | 10/2011 |
| WO | WO-2015/030240 A1 | 3/2015 |

OTHER PUBLICATIONS

International Search Report and Written Opinion dated Nov. 24, 2015, issued for PCT/JP2015/074812 and English translation of International Search Report.

Office Action dated Apr. 24, 2017, issued by the State Intellectual Property Office of People's Republic of China in corresponding Chinese Patent Application No. 201580000834.5.

* cited by examiner

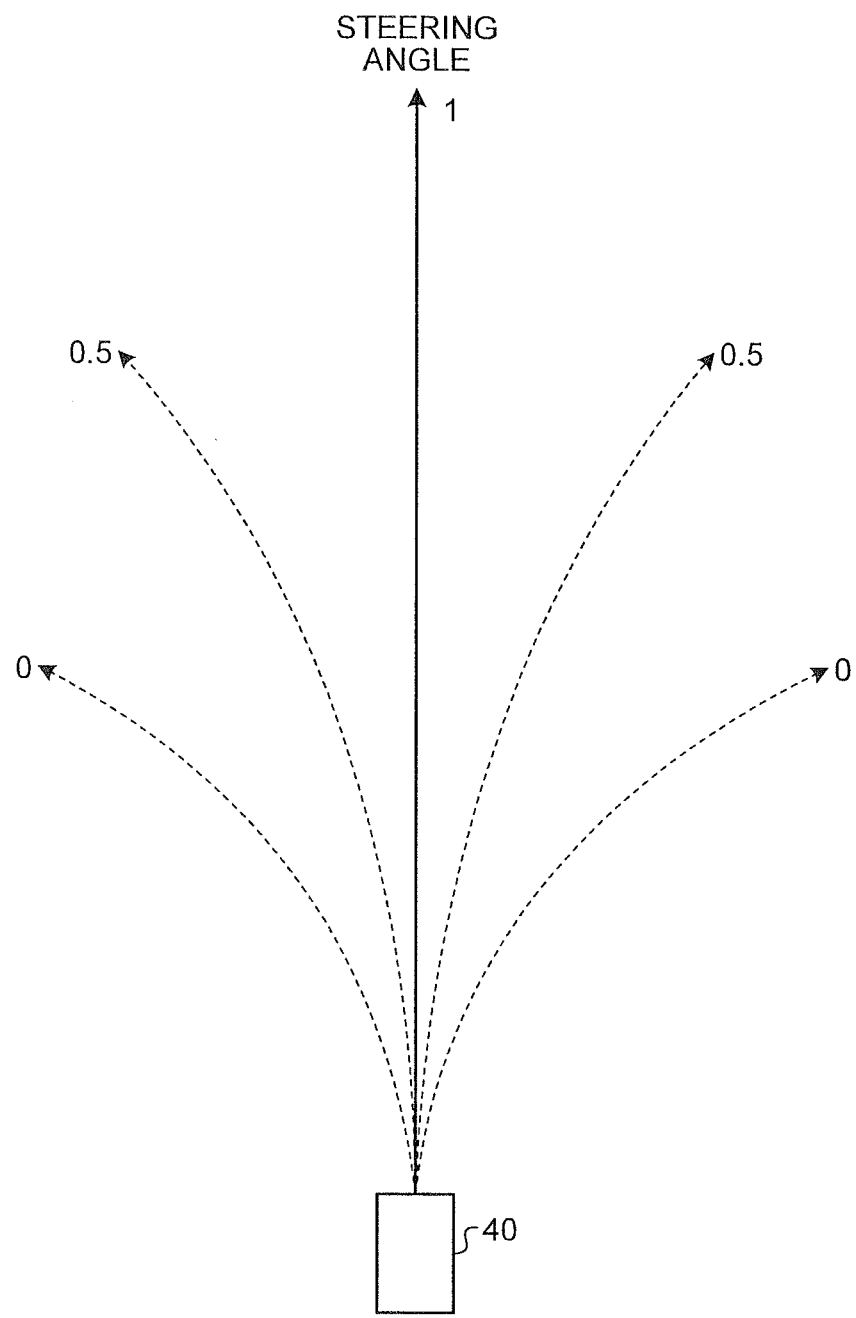

MINE MANAGEMENT SYSTEM

FIELD

The present invention relates to a mine management system.

BACKGROUND

Both an unmanned vehicle and a manned vehicle may operate in a mine. An unmanned vehicle and a manned vehicle can collide with each other in operations in a mine. Further, when an unmanned vehicle and a manned vehicle collide with each other, part of the operations in the mine may need to be stopped for coping with the collision. Consequently, productivity in the mine lowers. There is required a technique capable of avoiding a collision between an unmanned vehicle and a manned vehicle in order to prevent a reduction in safety and a reduction in productivity in a mine. A technique for estimating a range in which a manned vehicle is present and preventing an interference between an unmanned vehicle and the manned vehicle is disclosed in Patent Literature 1. A technique for issuing an alarm for a possible collision between a vehicle and other vehicle is disclosed in Patent Literature 2.

CITATION LIST

Patent Literature

Patent Literature 1: Japanese Laid-open Patent Publication No. 2000-339029 Publication
Patent Literature 2: Japanese Laid-open Patent Publication No. 2003-205804 Publication

SUMMARY

Technical Problem

It is effective to issue an alarm for avoiding a collision. However, when an unwanted alarm is issued although a collision is less likely, the operator of a manned vehicle can be accustomed to the alarm. Consequently, the original meaning of alarm can be lost.

It is an object of the present invention to provide a mine management system capable of preventing unwanted alarms from being issued and preventing a collision between an unmanned vehicle and a manned vehicle.

Solution to Problem

According to an embodiment of the present invention, there is provided a mine management system where an unmanned vehicle and a manned vehicle operate, the system comprising: an unmanned vehicle traveling data generation unit configured to generate unmanned vehicle traveling data including a target traveling route of the unmanned vehicle in the mine; an unmanned vehicle current situation data acquisition unit configured to acquire unmanned vehicle current situation data including unmanned vehicle region data at first time point and unmanned vehicle traveling speed data at the first time point; a manned vehicle current situation data acquisition unit configured to acquire manned vehicle current situation data including manned vehicle position data at the first time point and manned vehicle traveling speed data at the first time point; an unmanned vehicle existence range estimation unit configured to estimate a range in which the unmanned vehicle may be present at second time point at elapse of predetermined time after the first time point based on the unmanned vehicle current situation data; a manned vehicle existence position estimation unit configured to estimate a position where the manned vehicle may be present at the second time point based on the manned vehicle current situation data; and a collision risk determination unit configured to derive a risk level indicating a possibility of collision between the manned vehicle and the unmanned vehicle corresponding to the second time point at the first time point per position where the manned vehicle may be present based on an estimation result of the unmanned vehicle existence range estimation unit and an estimation result of the manned vehicle existence position estimation unit.

Advantageous Effects of Invention

According to an embodiment of the present invention, there is provided a mine management system capable of preventing unwanted alarms from being issued and avoiding a collision between an unmanned vehicle and a manned vehicle.

BRIEF DESCRIPTION OF DRAWINGS

FIG. 16 is a diagram illustrating an exemplary mine management method according to the embodiment.

DESCRIPTION OF EMBODIMENTS

Embodiments according to the present invention will be described below with reference to the drawings, but the present invention is not limited thereto. The components of the embodiments described below may be combined as needed. Further, some of the components may not be employed.

<Outline of Mining Machine Management System>

Figure 1:
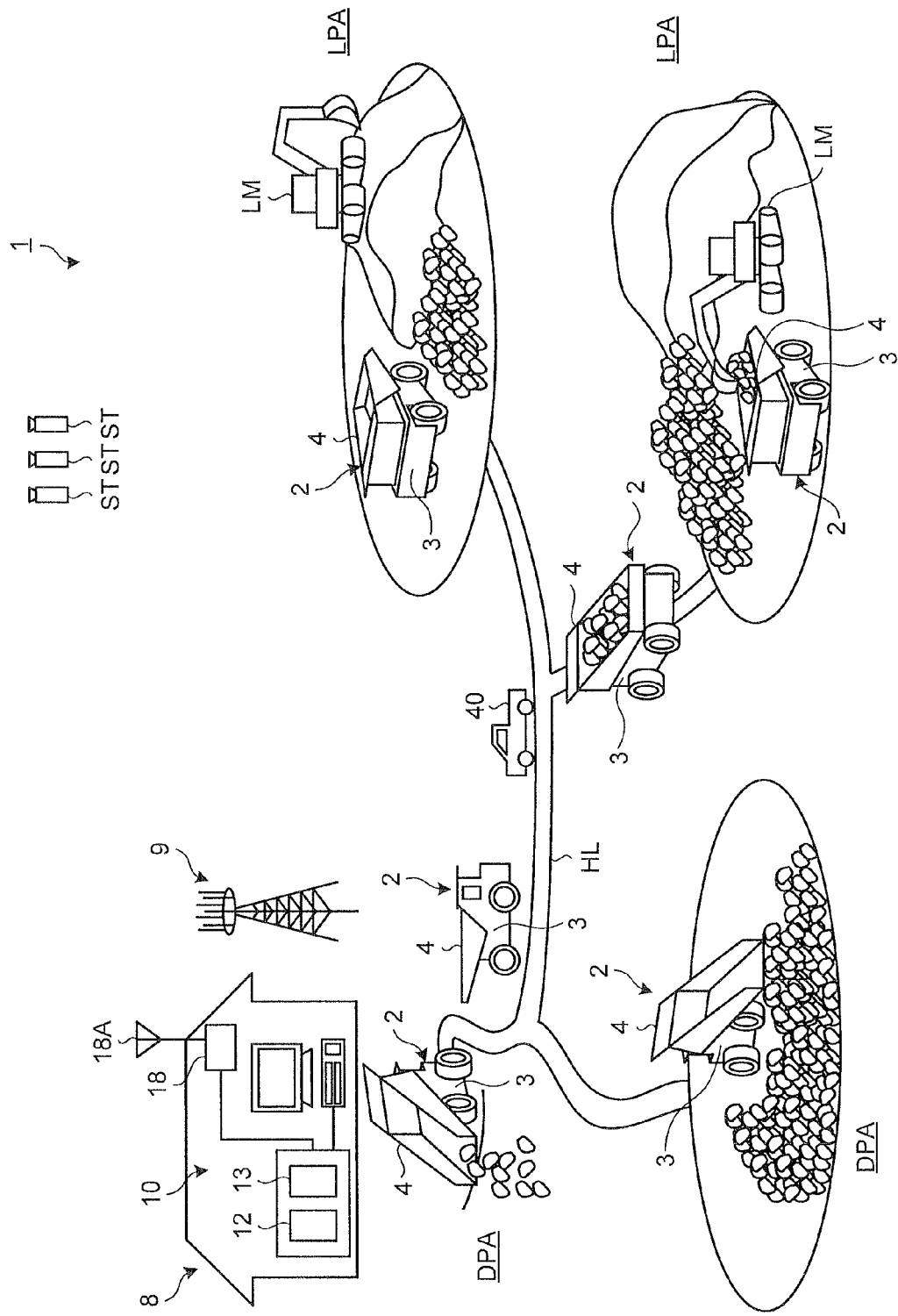
FIG. 1 is a schematic diagram illustrating an exemplary mine management system according to an embodiment.

FIG. 1 is a schematic diagram illustrating a mine management system 1 according to the present embodiment by way of example. FIG. 1 schematically illustrates a mining site to which the management system 1 is applied.

The management system 1 manages a mine. Unmanned vehicles 2 and a manned vehicle 40 operate in the mine. The mine management includes management of the unmanned vehicles 2 and management of the manned vehicle 40.

As illustrated in FIG. 1, the management system 1 includes a management apparatus 10 arranged in a control center 8 in the mine, and a communication system 9 capable of sending signals and data.

The management apparatus 10 includes a computer system. The communication system 9 includes a wireless communication system. The management apparatus 10, the unmanned vehicles 2 and the manned vehicle 40 can wirelessly communicate with each other via the communication system 9. The unmanned vehicle 2 operates in response to an instruction signal from the management apparatus 10. A worker (operator) does not mount on the unmanned vehicle 2. A worker (operator) mounts on the manned vehicle 40. The unmanned vehicle 2 may be operated by an operator mounting on the unmanned vehicle 2. For example, when at least any of parking the unmanned vehicle 2 in the parking area, putting the unmanned vehicle 2 out of the parking area, and putting petrol in the unmanned vehicle 2, an operator may mount on the unmanned vehicle 2 and operate the unmanned vehicle 2.

The unmanned vehicles 2 may be used in mining. According to the present embodiment, the unmanned vehicles 2 are assumed as dump trucks 2 as a type of transporter vehicles. The dump trucks 2 can travel in a mine and carry freights in the mine. The dump truck 2 has a vehicle 3 and a vessel 4 provided on the vehicle 3. The dump truck 2 carries freights loaded on the vessel 4. The freights include sediments or rocks caused in mining crushed rocks.

The worker mounts on the manned vehicle 40 and moves in the mine. The worker monitors and maintains the mine.

Loading sites LPA, unloading sites DPA, and a traveling course HL leading to at least one of the loading sites LPA and the unloading sites DPA are provided in the mining site. The dump trucks 2 can travel along the loading sites LPA, the unloading sites DPA, and the traveling course HL. The manned vehicle 40 can also travel along the loading sites LPA, the unloading sites DPA, and the traveling course HL. The traveling course HL in the mine may be dirt in many cases.

Freights are loaded on the vessel 4 in the loading site LPA. Freights are loaded on the vessel 4 by a loading machine LM. The loading machine LM employs an excavator or a wheel loader. The dump truck 2 loaded with freights travels along the traveling course HL from the loading site LPA to the unloading site DPA. The freights are unloaded from the vessel 4 in the unloading site DPA. The dump truck 2 unloaded with freights travels along the traveling course HL from the unloading site DPA to the loading site LPA. The dump truck 2 may travel from the unloading site DPA to a predetermined waiting area.

Positions of the dump trucks 2 and a position of the manned vehicle 40 are detected by the global positioning system (GPS). The GPS has a GPS satellite ST. A position detected by the GPS is an absolute position defined on the GPS coordinate system. In the following description, a position detected by the GPS will be called GPS position as needed. A GPS position includes coordinate date such as latitude, longitude, and altitude.

<Management Apparatus>

Figure 2:
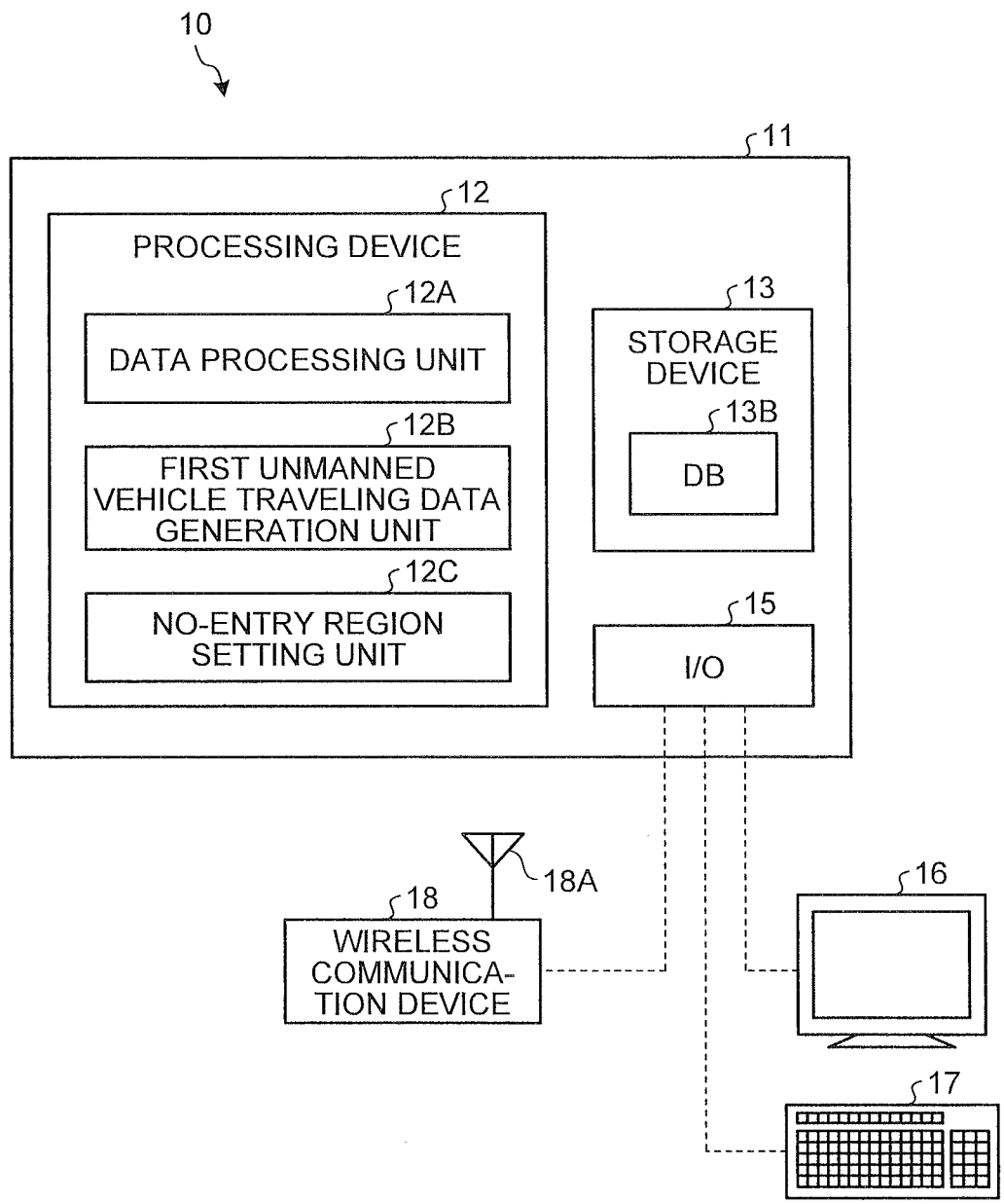
FIG. 2 is a schematic diagram illustrating an exemplary management apparatus according to the embodiment.

The management apparatus 10 will be described below. FIG. 2 is a block diagram illustrating the management apparatus 10 according to the present embodiment by way of example. As illustrated in FIG. 1 and FIG. 2, the management apparatus 10 includes a computer system 11, a display device 16, an input device 17, and a wireless communication device 18.

The computer system 11 includes a processing device 12, a storage device 13, and an I/O unit 15. The display device 16, the input device 17, and the wireless communication device 18 are connected to the computer system 11 via the I/O unit 15.

The processing device 12 includes a processor such as CPU (Central Processing Unit). The processing device 12 includes a data processing unit 12A, a first unmanned vehicle traveling data generation unit 12B, and a no-entry region setting unit 12C. The data processing unit 12A processes position data indicating a position of the dump truck 2, for example. The first unmanned vehicle traveling data generation unit 12B generates first unmanned vehicle traveling data including a target traveling route of the dump track 2 in the mine. The dump truck 2 travels based on the first unmanned vehicle traveling data generated by the first unmanned vehicle traveling data generation unit 12B along the loading site LPA, the unloading site DPA, and the traveling course HL. The no-entry region setting unit 12C sets a no-entry region where the dump trucks 2 are prohibited from entering in the mine.

The storage device 13 is connected to the processing device 12. The storage device 13 includes a memory such as random access memory (RAM), read only memory (ROM), flash memory, and hard disk drive. The storage device 13 includes a database 13B registering data therein. The first unmanned vehicle traveling data generation unit 12B generates the first unmanned vehicle traveling data by use of a computer program stored in the storage device 13.

The display device 16 includes a flat panel display such as liquid crystal display. The input device 17 includes an input device such as keyboard, touch panel and mouse. When the input device 17 is operated by a manager of a control center 8, the input device 17 generates an operation signal. The operation signal generated by the input device 17 is input into the processing device 12.

The communication system 9 includes a wireless communication device 18 arranged in the control center 8. The wireless communication device 18 is connected to the processing device 12 via the I/O unit 15. The wireless communication device 18 has an antenna 18A. The wireless communication device 18 is wirelessly communicable with the dump trucks 2 and the manned vehicle 40.

<Dump Truck>

Figure 3:
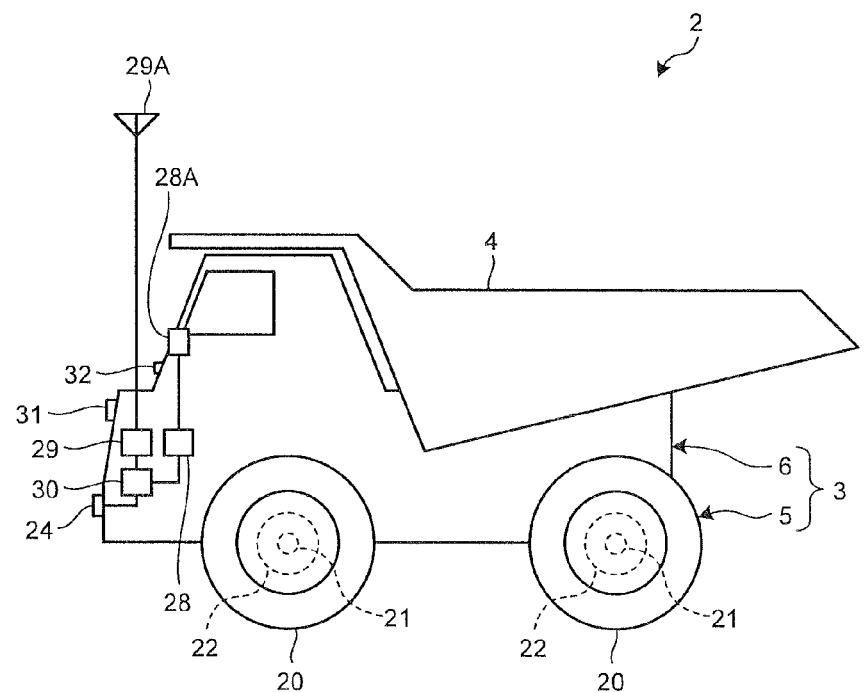
FIG. 3 is a schematic diagram illustrating an exemplary unmanned vehicle according to the embodiment.
Figure 4:
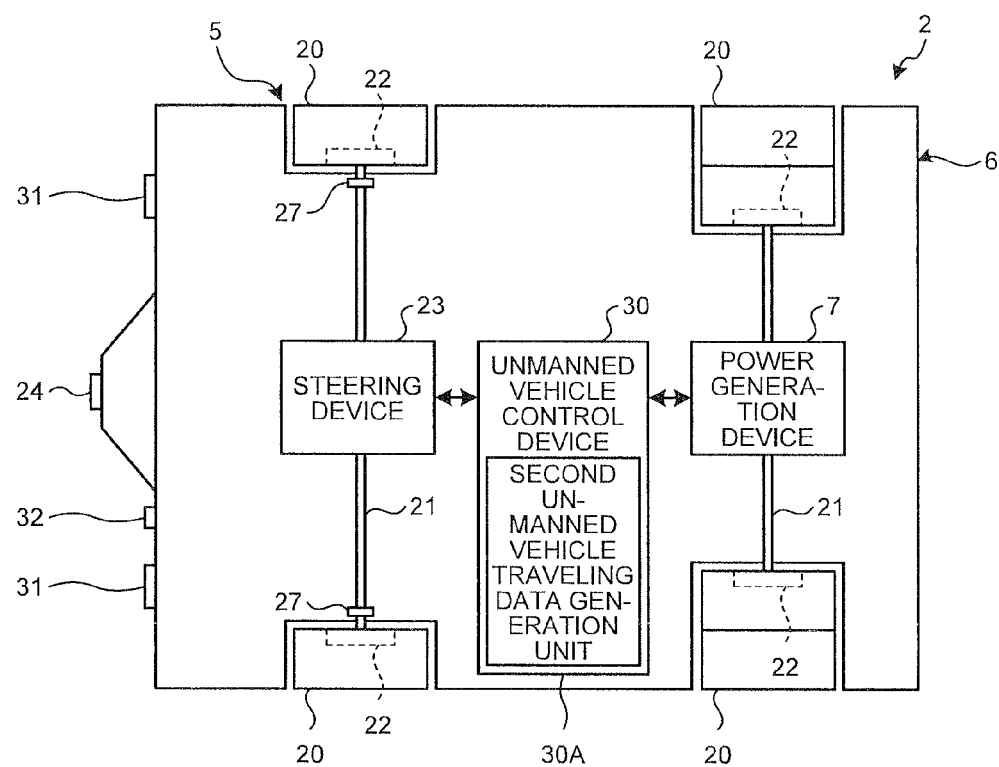
FIG. 4 is a schematic diagram illustrating an exemplary unmanned vehicle according to the embodiment.
Figure 5:
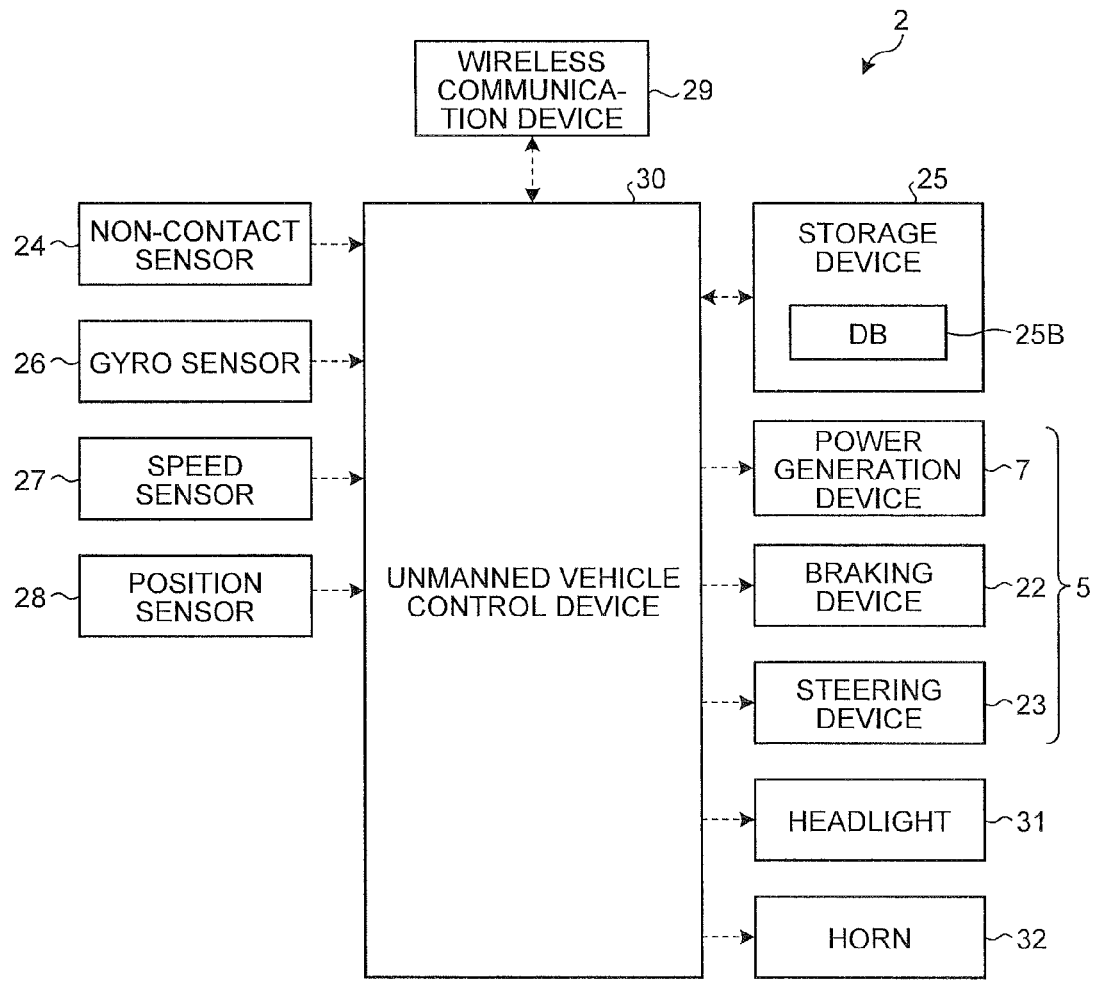
FIG. 5 is a functional block diagram illustrating an exemplary unmanned vehicle according to the embodiment.

The dump trucks 2 will be described below. FIG. 3 and FIG. 4 are the diagrams schematically illustrating the dump truck 2 according to the present embodiment by way of example. FIG. 5 is a functional block diagram illustrating the dump truck 2 according to the present embodiment by way of example.

The dump truck 2 includes the vehicle 3, the vessel 4 provided on the vehicle 3, a non-contact sensor 24 for detecting an object in a non-contact manner, a storage device 25 including a database 25B, a gyro sensor 26 for detecting an angular speed of the dump truck 2, a speed sensor 27 for detecting a traveling speed of the dump truck 2, a position sensor 28 for detecting a position of the dump truck 2, a wireless communication device 29, and an unmanned vehicle control device 30.

The vehicle 3 has a traveling device 5 capable of traveling in a mine, a vehicle main body 6 supported on the traveling device 5, a power generation device 7 for generating power, headlights 31, and a horn 32. The vessel 4 is supported on the vehicle main body 6. The headlights 31 are provided on the front of the vehicle main body 6. The headlights 31 illuminate a space ahead of the vehicle 3. The horn 32 issues an alarm sound.

The traveling device 5 has wheels 20, axles 21 for rotatably supporting the wheels 20, a braking device 22 capable of stopping traveling, and a steering device 23 capable of adjusting a traveling direction.

The traveling device 5 is driven by power generated by the power generation device 7. The power generation device 7 drives the traveling device 5 in an electric drive system. The power generation device 7 has an internal combustion engine such as diesel engine, a generator operating by power of the internal combustion engine, and an electric motor operating by power generated by the generator. Power generated by the electric motor is transmitted to the wheels 20 in the traveling device 5. Thereby, the traveling device 5 is driven. The dump truck 2 travels by power of the power generation device 7 provided on the vehicle 3. Output of the power generation device 7 is adjusted so that a traveling speed of the dump truck 2 is adjusted. The power generation device 7 may drive the traveling device 5 in a mechanical drive system. For example, power generated by the internal combustion engine may be transmitted to the wheels 20 in the traveling device 5 via a power transmission device.

The braking device 22 can stop driving the traveling device 5. The braking device 22 operates so that a traveling speed of the dump truck 2 is adjusted.

The steering device 23 can adjust a traveling direction of the traveling device 5. A traveling direction of the dump truck 2 including the traveling device 5 includes an orientation of the front of the vehicle main body 6. The steering device 23 adjusts a traveling direction of the dump truck 2 by changing an orientation of the front wheels.

The non-contact sensor 24 is provided on the front of the vehicle main body 6. The non-contact sensor 24 detects objects around the vehicle main body 6 in a non-contact manner. The non-contact sensor 24 includes a laser scanner. The non-contact sensor 24 detects an object by use of a laser light as detection light in a non-contact manner. The non-contact sensor 24 can detect the presence of an object, a relative position to the object, and a relative speed to the object. A relative position to an object includes a relative distance to the object, and an orientation in which the object is present relative to the non-contact sensor 24. The non-contact sensor 24 may include a radar device such as millimeter radar device. The radar device can detect an object by use of radio waves in a non-contact manner.

The gyro sensor 26 detects an angular speed of the dump truck 2. An angular speed of the dump truck 2 is integrated thereby to derive an orientation of the dump truck 2.

The speed sensor 27 detects a traveling speed of the dump truck 2. The speed sensor 27 includes a rotary speed sensor for detecting a rotary speed of the wheels 20. A rotary speed of the wheels 20 is correlated with a traveling speed of the dump truck 2. A rotary speed value as a detected value of the rotary speed sensor is converted into a traveling speed value of the dump truck 2. The speed sensor 27 may detect a rotary speed of the axles 21.

The position sensor 28 is arranged on the vehicle 3. The position sensor 28 includes a GPS receiver, and detects a position of the dump truck 2. The position sensor 28 has a GPS antenna 28A. The antenna 28A receives radio waves from the GPS satellite ST. The position sensor 28 converts a signal based on a radio wave from the GPS satellite ST received by the antenna 28A into an electric signal thereby to calculate a position of the antenna 28A. A GPS position of the antenna 28A is calculated so that a GPS position of the dump truck 2 is detected.

The communication system 9 includes the wireless communication device 29 arranged in the vehicle 3. The wireless communication device 29 has an antenna 29A. The wireless communication device 29 is wirelessly communicable with the management apparatus 10 and the manned vehicle 40.

The unmanned vehicle control device 30 is provided on the dump truck 2. The unmanned vehicle control device 30 controls the dump truck 2. The unmanned vehicle control device 30 includes a computer system. The unmanned vehicle control device 30 includes a processor such as CPU and a memory such as RAM and ROM. The management apparatus 10 supplies the unmanned vehicle control device 30 with an instruction signal including the first unmanned vehicle traveling data of the dump truck 2 via the communication system 9. The unmanned vehicle control device 30 controls the traveling device 5 in the dump truck 2 based on the first unmanned vehicle traveling data supplied from the first unmanned vehicle traveling data generation unit 12B in the management apparatus 10. The control of the traveling device 5 includes control of at least one of the steering wheel, the accelerator, and the brake in the traveling device 5.

The first unmanned vehicle traveling data generated in the first unmanned vehicle traveling data generation unit 12B in the management apparatus 10 indicates a target traveling route of the dump truck 2 and a limited traveling speed of the dump track 2. The management apparatus 10 determines a limited traveling speed (maximum permitted speed) of the dump truck 2 per a plurality of positions (regions) along the traveling course HL based on environmental conditions of the mine including geographical conditions and weather conditions of the mine. The management apparatus 10 transmits the first unmanned vehicle traveling data indicating a target traveling route and a limited traveling speed of the dump truck 2 to the dump truck 2.

The unmanned vehicle control device 30 has a second unmanned vehicle traveling data generation unit 30A for generating second unmanned vehicle traveling data. The second unmanned vehicle traveling data generation unit 30A in the unmanned vehicle control device 30 generates second unmanned vehicle traveling data including target traveling speed data of the dump truck 2 based on the first unmanned vehicle traveling data supplied from the management apparatus 10. The unmanned vehicle control device 30 controls the traveling device 5 based on the first unmanned vehicle traveling data supplied from the management apparatus 10 and the second unmanned vehicle traveling data generated in the second unmanned vehicle traveling data generation unit 30A. The unmanned vehicle control device 30 determines a traveling speed of the traveling device 5 within the limited traveling speed determined by the management apparatus 10 thereby to control the traveling device 5. In other words, the dump track 2 can determine a traveling speed in the second unmanned vehicle traveling data generation unit 30A with the limited traveling speed determined by the management apparatus 10 as an upper limit, and can freely accelerate and decelerate.

According to the present embodiment, the dump truck 2 travels based on the dead reckoning navigation. The dump truck 2 travels along the loading site LPA, the unloading site DPA, and the carrying course HL based on the first unmanned vehicle traveling data generated in the first unmanned vehicle traveling data generation unit 12B and the second unmanned vehicle traveling data generated in the second unmanned vehicle traveling data generation unit 30A. The unmanned vehicle control device 30 estimates a current position of the dump truck 2 by use of the dead reckoning navigation, and drives the dump truck 2 based on the target traveling route supplied from the first unmanned vehicle traveling data generation unit 12B and the target traveling speed data generated in the second unmanned vehicle traveling data generation unit 30A. The dead reckoning navigation is a navigation method for estimating a current position of the dump truck 2 based on an orientation and a motion distance from a start point of which longitude and latitude are known. An orientation of the dump truck 2 is detected by the gyro sensor 26 arranged on the dump truck 2. A motion distance of the dump truck 2 is detected by use of the speed sensor 27 arranged on the dump truck 2. A detection signal of the gyro sensor 26 and a detection signal of the speed sensor 27 are output to the unmanned vehicle control device 30 in the dump truck 2. The unmanned vehicle control device 30 can find an orientation of the dump truck 2 from the known start point based on the detection signal from the gyro sensor 26. The unmanned vehicle control device 30 can find a motion distance of the dump truck 2 from the known start point based on the detection signal from the speed sensor 27. The unmanned vehicle control device 30 controls traveling of the traveling device 5 in the dump truck 2 to travel according to the target traveling route in the first unmanned vehicle traveling data and the target traveling speed data in the second unmanned vehicle data based on the detection signal from the gyro sensor 26 and the detection signal from the speed sensor 27.

According to the present embodiment, an estimated position of the dump truck 2 found by the dead reckoning navigation is corrected by use of the GPS. As the motion distance of the dump truck 2 is longer, an error can occur between the estimated position as the estimated current position of the dump truck 2 and the actual position due to accumulated detection errors of one or both of the gyro sensor 26 and the speed sensor 27. Consequently, the dump truck 2 can travel out of the target traveling route in the first unmanned vehicle traveling data. According to the present embodiment, the unmanned vehicle control device 30 drives the dump truck 2 while correcting the estimated position of the dump truck 2 estimated by the dead reckoning navigation by use of the GPS position data indicating the GPS position of the dump truck 2 detected by the position sensor 28. The unmanned vehicle control device 30 calculates the correction amount for correcting the position of the dump truck 2 based on the detection signal from the gyro sensor 26, the detection signal from the speed sensor 27, and the GPS position data such that the dump truck 2 travels along the target traveling route, and controls traveling of the traveling device 5 in the dump truck 2 based on the calculated correction amount.

An estimated position found by the dead reckoning navigation is corrected by use of the GPS according to the present embodiment, but may be corrected with other method. For example, a landmark of which installation position is registered is detected by the non-contact sensor 24 mounted on the dump truck 2, and the estimated position may be corrected based on a detection result of the non-contact sensor 24. The landmarks may be a plurality of constructions arranged along the traveling course HL. The installation positions (absolute positions) of the landmarks are previously measured and registered. A roadside map of the traveling course HL is previously measured, and the estimated position may be corrected based on a collation result between the roadside map and the shape of the traveling course HL detected by the non-contact sensor 24.

<Manned Vehicle>

Figure 6:
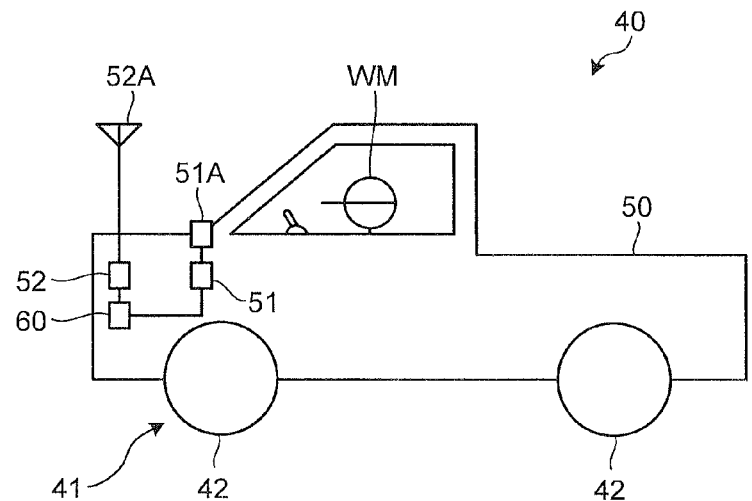
FIG. 6 is a schematic diagram illustrating an exemplary manned vehicle according to the embodiment.
Figure 7:
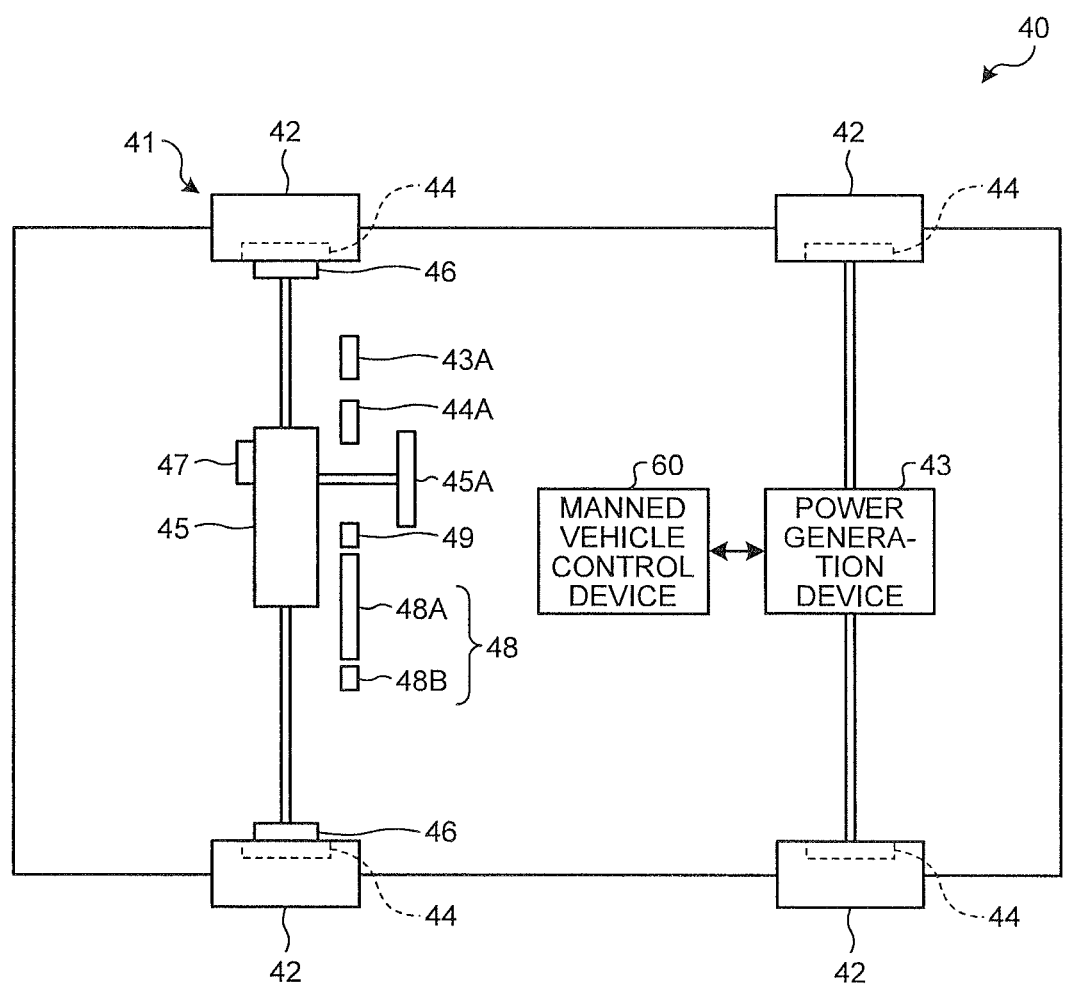
FIG. 7 is a schematic diagram illustrating an exemplary manned vehicle according to the embodiment.
Figure 8:
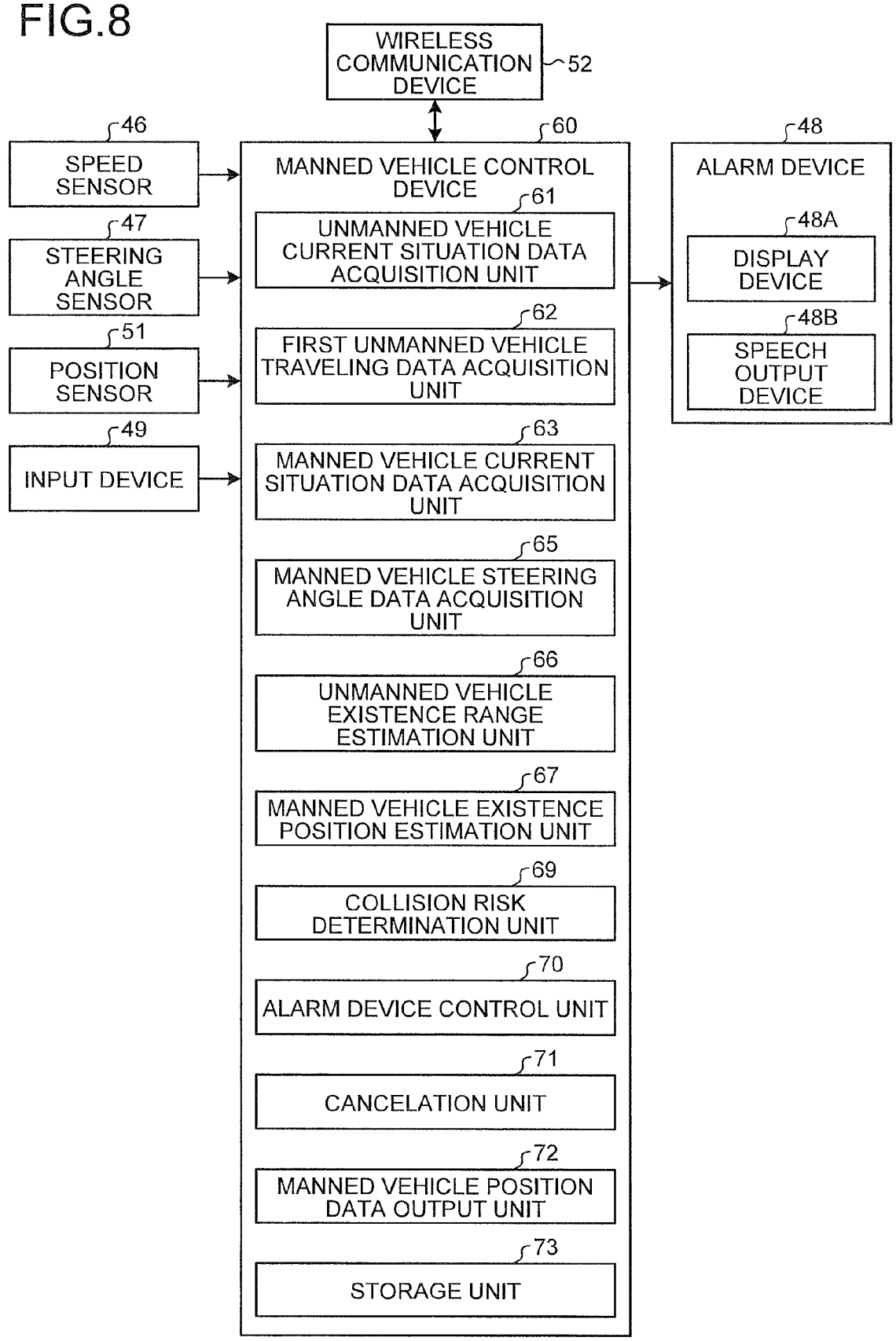
FIG. 8 is a functional block diagram illustrating an exemplary manned vehicle according to the embodiment.

The manned vehicle 40 will be described below. FIG. 6 and FIG. 7 are the diagrams schematically illustrating the manned vehicle 40 according to the present embodiment by way of example. FIG. 8 is a functional block diagram illustrating the manned vehicle 40 according to the present embodiment by way of example.

The manned vehicle 40 includes a traveling device 41 capable of traveling in a mine, a vehicle main body 50 supported on the traveling device 41, a power generation device 43 for generating power, and a manned vehicle control device 60.

The traveling device 41 has wheels 42, axles for rotatably supporting the wheels 42, a braking device 44 capable of stopping traveling, and a steering device 45 capable of adjusting a traveling direction.

The traveling device 41 is driven by power generated by the power generation device 43. The power generation device 43 includes an internal combustion engine such as diesel engine. Power generated in the power generation device 43 is transmitted to the wheels 42 of the traveling device 41. Thereby, the traveling device 41 is driven. Output of the power generation device 43 is adjusted so that a traveling speed of the manned vehicle 40 is adjusted.

The braking device 44 can stop driving the traveling device 41. The braking device 44 operates so that a traveling speed of the manned vehicle 40 is adjusted.

The steering device 45 can adjust a traveling direction of the traveling device 41. A traveling direction of the manned vehicle 40 including the traveling device 41 includes an orientation of the front of the vehicle main body 50. The steering device 45 adjusts a traveling direction of the manned vehicle 40 by changing an orientation of the front wheels.

The manned vehicle 40 has an operator's chamber in which a worker WM sits. The manned vehicle 40 has an accelerator operation unit 43A provided in the operator's chamber and directed for operating the power generation device 43, a brake operation unit 44A provided in the operator's chamber and directed for operating the braking device 44, and a steering wheel operation unit 45A provided in the operator's chamber and directed for operating the steering device 45. The accelerator operation unit 43A includes an accelerator pedal. The brake operation unit 44A includes a brake pedal. The steering wheel operation unit 45A includes a steering wheel. The accelerator operation unit 43A, the brake operation unit 44A, and the steering wheel operation unit 45A are operated by the worker WM. The worker WM operates one or both of the accelerator operation unit 43A and the brake operation unit 44A thereby to adjust a traveling speed of the manned vehicle 40. The worker WM operates the steering wheel operation unit 45A to adjust a traveling direction of the manned vehicle 40.

The manned vehicle 40 has an alarm device 48 arranged in the operator's chamber and an input device 49 arranged in the operator's chamber. The alarm device 48 includes a display device 48A or a speech output device 48B. The display device 48A includes a flat panel display such as liquid crystal display. The display device 48A can display alarm data. The speech output device 48B can issue an alarm sound.

The input device 49 includes an input device such as keyboard, touch panel, and mouse. When the input device 49 is operated by the worker WM of the manned vehicle 40, the input device 49 generates an operation signal. The operation signal generated by the input device 49 is input into the manned vehicle control device 60. The input device 49 may include a speech recognition device and an operation signal may be generated by speech of the worker WM. When the input device 49 includes a touch panel, the input device 49 may be used as the display device 48A.

The manned vehicle 40 includes a speed sensor 46 for detecting a traveling speed of the manned vehicle 40, a steering angle sensor 47 for detecting a steering angle of the steering device 45, a position sensor 51 for detecting a position of the manned vehicle 40, and a wireless communication device 52.

The speed sensor 46 is provided on the manned vehicle 40. The speed sensor 46 detects a traveling speed of the traveling device 41 in the manned vehicle 40. The speed sensor 46 includes a rotary speed sensor for detecting a rotary speed of the wheels 42. A rotary speed of the wheels 42 is correlated with a traveling speed of the manned vehicle 40. A rotary speed value as a detected value of the rotary speed sensor is converted into a traveling speed value of the manned vehicle 40. A traveling speed of the manned vehicle 40 is integrated thereby to derive a motion distance of the manned vehicle 40.

The steering angle sensor 47 is provided on the manned vehicle 40. The steering angle sensor 47 detects a steering angle of the traveling device 41 in the manned vehicle 40. A rotary encoder may be employed as the steering angle sensor 47, for example. The steering angle sensor 47 detects the operation amount of the steering device 45 thereby to detect a steering angle. A steering angle of the steering device 45 is correlated with a traveling direction of the manned vehicle 40. A traveling direction of the manned vehicle 40 is derived based on a detected value of the steering angle sensor 47. Further, a steering angle of the steering device 45 is correlated with a turning radius of the traveling manned vehicle 40. A turning radius of the manned vehicle 40 is derived based on a detected value of the steering angle sensor 47.

The position sensor 51 is arranged on the manned vehicle 40. The position sensor 51 includes a GPS receiver, and detects a position of the manned vehicle 40. The position sensor 51 has a GPS antenna 51A. The antenna 51A receives radio waves from the GPS satellite ST. The position sensor 51 converts a signal based on a radio wave from the GPS satellite ST received by the antenna 51A into an electric signal thereby to calculate a position of the antenna 51A. A GPS position of the antenna 51A is calculated so that a GPS position of the manned vehicle 40 is detected.

The communication system 9 includes the wireless communication device 52 arranged on the manned vehicle 40. The wireless communication device 52 has an antenna 52A. The wireless communication device 52 is wirelessly communicable with the management apparatus 10 and the dump trucks 2.

The manned vehicle control device 60 is provided on the manned vehicle 40. The manned vehicle control device 60 controls the manned vehicle 40. The manned vehicle control device 60 includes a computer system. The manned vehicle control device 60 includes a processor such as CPU and a memory such as RAM and ROM.

A detection signal of the speed sensor 46 is output to the manned vehicle control device 60. A detection signal of the steering angle sensor 47 is output to the manned vehicle control device 60. A detection signal of the position sensor 51 is output to the manned vehicle control device 60. An operation signal generated in the input device 49 is output to the manned vehicle control device 60. An instruction signal from the management apparatus 10 is supplied to the manned vehicle control device 60 via the communication system 9. The manned vehicle control device 60 controls the alarm device 48. The manned vehicle control device 60 outputs a control signal for controlling the alarm device 48.

As illustrate in FIG. 8, the manned vehicle control device 60 has an unmanned vehicle current situation data acquisition unit 61 for acquiring unmanned vehicle current situation data, a first unmanned vehicle traveling data acquisition unit 62 for acquiring first unmanned vehicle traveling data, a manned vehicle current situation data acquisition unit 63 for acquiring manned vehicle current situation data, a manned vehicle steering angle data acquisition unit 65 for acquiring manned vehicle steering angle data, an unmanned vehicle existence range estimation unit 66 for estimating an unmanned vehicle existence range in which the dump truck 2 may be present, a manned vehicle existence position estimation unit 67 for estimating a manned vehicle existence position where the manned vehicle 40 may be present, a collision risk determination unit 69 for determining a possibility of collision between the dump truck 2 and the manned vehicle 40, an alarm device control unit 70 for outputting a control signal for controlling the alarm device 48, a cancellation unit 71 for generating a cancellation signal for cancelling a control signal output from the alarm device control unit 70, a manned vehicle position data output unit 72 for outputting manned vehicle position data, and a storage unit 73.

The unmanned vehicle current situation data acquisition unit 61 acquires unmanned vehicle current situation data including unmanned vehicle region data at first time point t0 and unmanned vehicle traveling speed data at first time point t0 via the communication system 9 including the wireless communication device 52. The unmanned vehicle current situation data acquisition unit 61 may acquire the unmanned vehicle current situation data not via the communication system 9. For example, the unmanned vehicle current situation data acquisition unit 61 may acquire the unmanned vehicle current situation data via vehicle-to-vehicle communication with the dump truck 2. Further, when unmanned vehicle current situation data of the dump trucks 2 operating in the mine is output to the management apparatus 10, the unmanned vehicle current situation data acquisition unit 61 may acquire the unmanned vehicle current situation data from the management apparatus 10.

According to the present embodiment, first time point t0 is current time point. In the following description, first time point t0 will be called current time point t0 as needed. First time point t0 may not be current time point.

The unmanned vehicle region data indicating a region where the dump truck 2 is present at current time point t0 is acquired from the position sensor 28 in the dump truck 2 via the communication system 9. The unmanned vehicle region data at current time point t0 is acquired based on a GPS position of the dump truck 2 detected by the position sensor 28. According to the present embodiment, the large-sized dump truck 2 traveling in a mine is handled in consideration of not only position but also vehicle width and vehicle length. The unmanned vehicle traveling speed data indicating a traveling speed of the dump truck 2 at current time point t0 is acquired from the first unmanned vehicle traveling data generation unit 12B in the management apparatus 10 via the communication system 9. The unmanned vehicle region data at current time point t0 and the unmanned vehicle traveling speed data at current time point t0 are transmitted to the manned vehicle 40 via the communication system 9.

The first unmanned vehicle traveling data acquisition unit 62 acquires the first unmanned vehicle traveling data generated in the first unmanned vehicle traveling data generation unit 12B in the management apparatus 10 via the communication system 9 including the wireless communication device 52.

The manned vehicle current situation data acquisition unit 63 acquires manned vehicle current situation data including manned vehicle position data at current time point t0 and manned vehicle traveling speed data at current time point t0.

The manned vehicle position data indicating a position where the manned vehicle is present at current time point t0 is acquired from the position sensor 51. The manned vehicle traveling speed data indicating a traveling speed of the manned vehicle 40 at current time point t0 is acquired from the speed sensor 46.

The manned vehicle steering angle data acquisition unit 65 acquires manned vehicle steering angle data indicating a steering angle of the traveling device 41 in the manned vehicle 40 from the steering angle sensor 47.

The unmanned vehicle existence range estimation unit 66 estimates an unmanned vehicle existence range ER where the dump truck 2 may be present at predetermined time point t (t1, t2, . . . , tn) as second time point when a predetermined time elapses from current time point t0 based on the unmanned vehicle current situation data at current time point t0. The predetermined time point t includes a plurality of predetermined time points t1, t2, . . . , tn which are different in elapsed time from current time point t0. Predetermined time point t1 is when a first time elapses from current time point t0. Predetermined time point t2 is when a second time elapses from current time point t0. Predetermined time point tn is when an n-th time elapses from current time point t0. The unmanned vehicle existence range estimation unit 66 estimates an unmanned vehicle existence range ER(t1), ER(t2), . . . , ER(tn) at a plurality of predetermined time points t1, t2, . . . , tn, respectively.

The manned vehicle existence position estimation unit 67 estimates a manned vehicle existence position EP where the manned vehicle 40 may be present at predetermined time point t based on the manned vehicle current situation data at current time point t0. The manned vehicle existence position estimation unit 67 estimates manned vehicle existence positions EP(t1), EP(t2), . . . , EP(tn) at a plurality of predetermined time points t1, t2, . . . , tn, respectively.

The manned vehicle existence position estimation unit 67 estimates a plurality of manned vehicle existence positions EP (EP1, EP2, . . . , EPm) indicating where the manned vehicle 40 may be present at predetermined time point t when the traveling device 41 in the manned vehicle 40 travels at a plurality of different steering angles r (r1, r2, . . . , rm), respectively, based on the manned vehicle current situation data at current time point t0. When the traveling device 41 travels at the first steering angle r1, a position where the manned vehicle 40 may be present at predetermined time point t1 is the manned vehicle existence position EP1($t$1), a position where the manned vehicle 40 may be present at predetermined time point t2 is the manned vehicle existence position EP1($t$2), and a position where the manned vehicle 40 may be present at predetermined time point tn is the manned vehicle existence position EP1($tn$). When the traveling device 41 travels at the second steering angle r2, a position where the manned vehicle 40 may be present at predetermined time point t1 is the manned vehicle existence position EP2($t$1), a position where the manned vehicle 40 may be present at predetermined time point t2 is the manned vehicle existence position EP2($t$2), and a position where the manned vehicle 40 may be present at predetermined time point tn is the manned vehicle existence position EP2($tn$). When the traveling device 41 travels at the m-th steering angle rm, a position where the manned vehicle 40 may be present at predetermined time point t1 is the manned vehicle existence position EPm(t1), a position where the manned vehicle 40 may be present at predetermined time point t2 is the manned vehicle existence position EPm(t2), and a position where the manned vehicle 40 may be present at predetermined time point tn is the manned vehicle existence position EPm(tn).

The collision risk determination unit 69 derives a risk level indicating a possibility of collision between the manned vehicle 40 and the dump truck 2 corresponding to predetermined time point t at current time point t0 per manned vehicle existence position EP where the manned vehicle 40 may be present based on an estimation result of the unmanned vehicle existence range estimation unit 66 and an estimation result of the manned vehicle existence position estimation unit 67.

The alarm device control unit 70 outputs a control signal for controlling the alarm device 48 for issuing an alarm to the manned vehicle 40 based on a risk level derived in the collision risk determination unit 69.

The cancellation unit 71 generates a cancellation signal for cancelling a control signal output from the alarm device control unit 70.

The manned vehicle position data output unit 72 acquires manned vehicle position data indicating a position of the manned vehicle 40 from the position sensor 51, and outputs the manned vehicle position data to the management apparatus 10 via the communication system 9.

The storage unit 73 stores various items of data on the dump trucks 2 and the manned vehicle 40. According to the present embodiment, the storage unit 73 stores at least maximum acceleration data indicating a maximum acceleration at which the dump truck 2 can accelerate and maximum deceleration data indicating a maximum deceleration at which the dump truck 2 can decelerate.

<Traveling Method of Dump Trucks>

Figure 9:
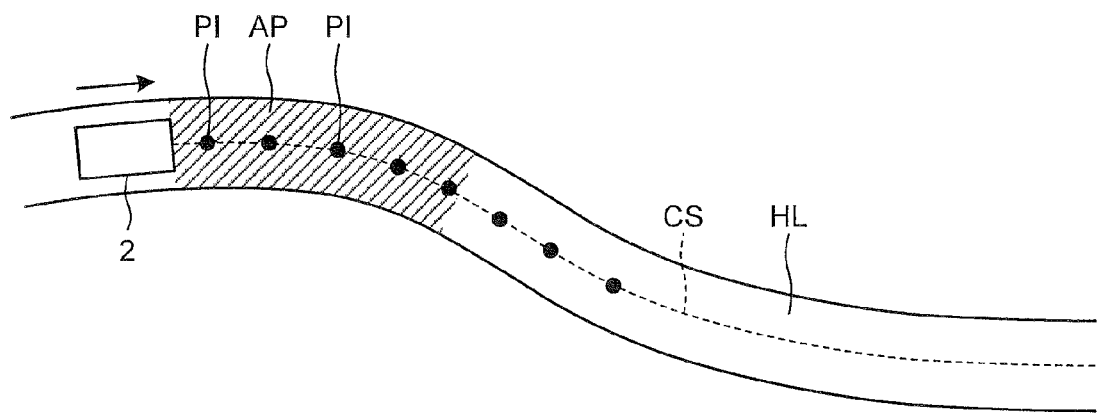
FIG. 9 is a diagram illustrating an exemplary mine management method according to the embodiment.
Figure 10:
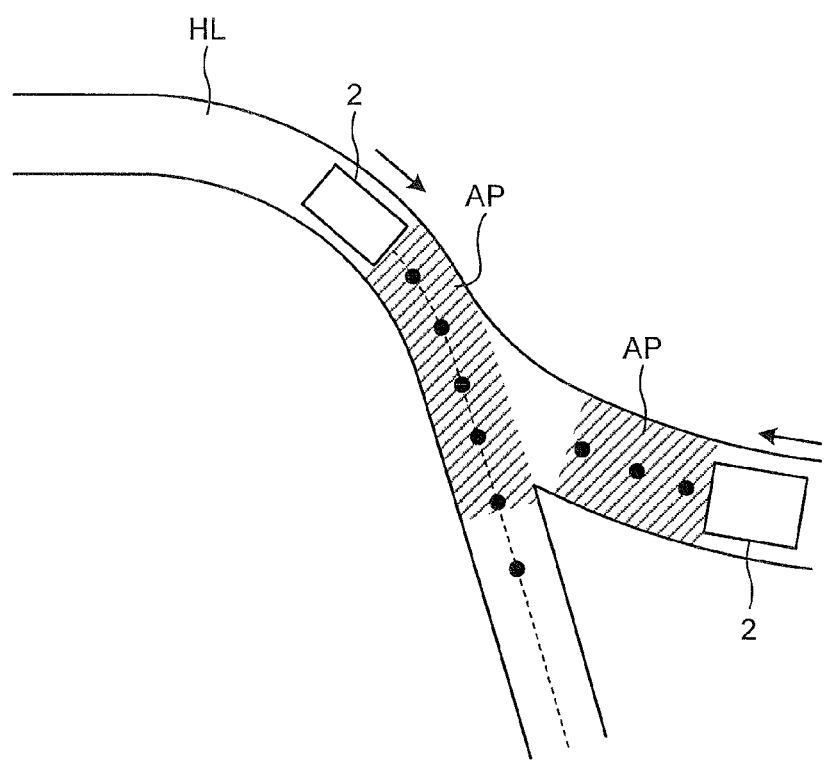
FIG. 10 is a diagram illustrating an exemplary mine management method according to the embodiment.

The traveling method of the dump trucks 2 will be described below by way of example. FIG. 9 and FIG. 10 are the diagrams schematically illustrating the dump truck 2 traveling according to the first unmanned vehicle traveling data and the second unmanned vehicle traveling data.

As illustrated in FIG. 9, a target traveling route CS is set for the traveling course HL. The first unmanned vehicle traveling data indicating a target traveling route CS of the dump truck 2 and a limited traveling speed of the dump truck 2 in the carrying work is generated by the first unmanned vehicle traveling data generation unit 12B. The limited traveling speed of the dump truck 2 is a maximum permitted speed of the dump truck 2 which is determined based on the environmental conditions of the mine including the environments of the traveling course HL. The environments of traveling course HL include various environmental conditions of the traveling course HL such as gradient of the traveling course HL, curvature of curve, other working machines, and presence of oncoming vehicle.

The target traveling route CS is defined on the traveling course HL. The first unmanned vehicle traveling data generated in the first unmanned vehicle traveling data generation unit 12B is supplied to the unmanned vehicle control device 30 in the dump truck 2 via the communication system 9. The unmanned vehicle control device 30 controls the traveling device 5 based on the first unmanned vehicle traveling data supplied from the first unmanned vehicle traveling data generation unit 12B. The second unmanned vehicle traveling data generation unit 30A in the unmanned vehicle control device 30 generates target traveling speed data of the dump truck 2 along the traveling course HL based on the first unmanned vehicle traveling data. The second unmanned vehicle traveling data generation unit 30A determines a target traveling speed of the dump truck 2 along the traveling course HL so as not to exceed the limited traveling speed supplied from the first unmanned vehicle traveling data generation unit 12B. Further, the target traveling speed of the dump truck 2 includes a target acceleration and a target deceleration of the dump truck 2. The unmanned vehicle control device 30 controls the traveling device 5 based on the target traveling route CS and the target traveling speed data.

The unmanned vehicle control device 30 controls the steering device 23 such that the traveling device 5 travels along the target traveling route CS in the first unmanned vehicle traveling data. The unmanned vehicle control device 30 controls the power generation device 7 and the braking device 22 such that the traveling device 5 travels at the target traveling speed in the second unmanned vehicle traveling data.

According to the present embodiment, the target traveling route CS is a collection of points PI indicating the GPS positions. The points PI are set at constant intervals. The interval between the points PI may be 1 m or 5 m, for example. A limited traveling speed and a target traveling speed are given to each of the points PI. That is, the first unmanned vehicle traveling data generation unit 12B in the management apparatus 10 determines a limited traveling speed per points PI. The second unmanned vehicle traveling data generation unit 30A in the dump truck 2 determines a target traveling speed per points PI.

The management apparatus 10 sets a traveling permitted region AP of the dump truck 2. The dump truck 2 can travel in the set traveling permitted region AP. The traveling permitted region AP is set along the target traveling route CS. The traveling permitted region AP is set forward in a traveling direction of the dump truck 2. The traveling permitted region AP is set to include the points PI. In the example illustrated in FIG. 9, the traveling permitted region AP includes five points PI. The traveling permitted region AP is updated along with motion of the dump truck 2. For example, as the dump truck 2 advances, the traveling permitted region AP is updated to move forward in synchronization with the dump truck 2. After the dump truck 2 passes, the traveling permitted region AP along the traveling course HL, where the dump truck 2 has passed, is unset.

FIG. 10 schematically illustrates a state in which two dump trucks 2 travel along the traveling course HL to approach each other. The management apparatus 10 sets the traveling permitted regions AP of the two dump trucks 2, respectively. The management apparatus 10 sets the traveling permitted regions AP of the two dump trucks 2, respectively, such that the two dump trucks 2 do not collide with each other. In the example illustrated in FIG. 10, the traveling permitted region AP of one dump truck 2 is set to include five points PI. The traveling permitted region AP of the other dump truck 2 is set to include three points PI. The management apparatus 10 sets the two traveling permitted regions AP such that the traveling permitted region AP of one dump truck 2 does not overlap on the traveling permitted region AP of the other dump truck 2. Thereby, a collision between the dump trucks 2 can be avoided.

<Unmanned Vehicle Existence Range>

The unmanned vehicle existence range ER will be described below. The unmanned vehicle existence range ER is where the dump truck 2 may be present at predetermined time point t at elapse of predetermined time after current time point t0. The unmanned vehicle existence range ER is estimated by the unmanned vehicle existence range estimation unit 66. The second unmanned vehicle traveling data generation unit 30A in the dump truck 2 generates the second unmanned vehicle traveling data including a target traveling speed within a limited traveling speed given by the first unmanned vehicle traveling data generation unit 12B. The dump truck 2 travels along the traveling course HL based on the target traveling route CS given by the management apparatus 10 and the target traveling speed generated in the second unmanned vehicle traveling data generation unit 30A. That is, the dump truck 2 can freely accelerate or decelerate within the limited traveling speed given by the first unmanned vehicle traveling data generation unit 12B in the traveling permitted region AP.

The unmanned vehicle existence range ER is estimated in consideration of acceleration and deceleration of the dump truck 2 based on the second unmanned vehicle traveling data. The manned vehicle 40 is supplied with the first unmanned vehicle traveling data defining a limited traveling speed from the management apparatus 10. On the other hand, the manned vehicle 40 is not supplied with the second unmanned vehicle traveling data defining a target traveling speed. The dump truck 2 freely accelerates and decelerates within the limited traveling speed defined by the first unmanned vehicle traveling data. That is, the manned vehicle control device 60 acquires the limited traveling speed data (the first unmanned vehicle traveling data) of the dump truck 2 but does not acquire a target traveling speed, acceleration, and deceleration (the second unmanned vehicle traveling data) defined within the limited traveling speed. Therefore, the unmanned vehicle existence range estimation unit 66 in the manned vehicle control device 60 estimates an unmanned vehicle existence range ER based on the first unmanned vehicle traveling data in consideration of acceleration and deceleration of the dump truck 2 based on the second unmanned vehicle traveling data.

An unmanned vehicle existence range ER at predetermined time point t is estimated based on unmanned vehicle current situation data at current time point t0. According to the present embodiment, an unmanned vehicle existence range ER at predetermined time point t is estimated based on the unmanned vehicle current situation data at current time point t0 and the first unmanned vehicle traveling data generated in the first unmanned vehicle traveling data generation unit 12B. The unmanned vehicle existence range ER is estimated as a shape along the target traveling route CS in the first unmanned vehicle traveling data.

When the dump truck 2 travels at a constant speed, a size of the unmanned vehicle existence range ER slightly enlarges for a control error or the like, but is almost the same as the size of the dump truck 2. When the dump truck 2 travels while accelerating or decelerating, a size of the unmanned vehicle existence range ER is different from the size of the dump truck 2. According to the present embodiment, the unmanned vehicle existence range estimation unit 66 estimates an unmanned vehicle existence range ER based on the maximum acceleration data indicating a maximum acceleration at which the dump truck 2 can accelerate and the maximum deceleration data indicating a maximum deceleration at which the dump truck 2 can decelerate. The maximum acceleration of the dump truck 2 is an acceleration at which the dump truck 2 can accelerate at maximum output of the power generation device 7 in the dump truck 2. The maximum deceleration of the dump truck 2 is a deceleration (negative acceleration) at which the dump truck 2 can decelerate when the braking device 22 in the dump truck 2 produces a maximum braking force or is in the full-braking state. The maximum acceleration data and the maximum deceleration data are known data and are stored in the storage unit 73. An unmanned vehicle existence range ER is estimated based on the maximum acceleration data and the maximum deceleration data so that an actual position EPr of the dump truck 2 at predetermined time point t is arranged within the unmanned vehicle existence range ER.

Figure 11:
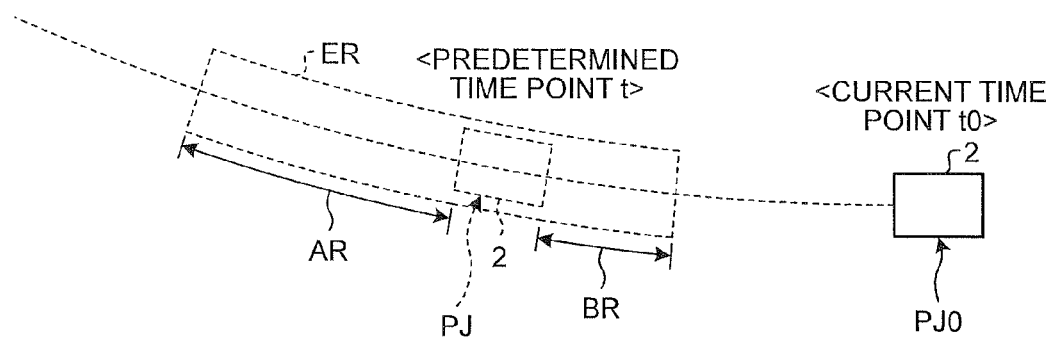
FIG. 11 is a diagram illustrating an exemplary mine management method according to the embodiment.

FIG. 11 is a diagram schematically illustrating an unmanned vehicle existence range ER estimated in consideration of a maximum acceleration and a maximum deceleration of the dump truck 2 by way of example. In consideration of a maximum acceleration of the dump truck 2, an unmanned vehicle existence range ER is set to extend ahead of a position PJ of the dump truck 2 at predetermined time point t when the dump truck 2 travels at a constant traveling speed at current time point t0. In consideration of a maximum deceleration of the dump truck 2, an unmanned vehicle existence range ER is set to extend behind the position PJ of the dump truck 2 at predetermined time point t when the dump truck 2 travels at a constant traveling speed at current time point t0.

In the example illustrated in FIG. 11, the unmanned vehicle existence range ER includes an acceleration range AR where the dump truck 2 may be present at predetermine time point t when traveling at maximum acceleration from a position PJ0 where the dump truck 2 is present at current time point t0 between current time point t0 and predetermined time point t while the dump truck 2 is traveling at a traveling speed (reference speed) at current time point t0. The unmanned vehicle existence range ER includes a deceleration range BR where the dump truck 2 may be present at predetermined time point t when traveling at maximum deceleration from the position PJ0 where the dump truck 2 is present at current time point t0 between current time point t0 and predetermined time point t while the dump truck 2 is traveling at a traveling speed (reference speed) at current time point t0. The unmanned vehicle existence range ER is a range between a predicted arrival point of the dump truck 2 at predetermined time point t when traveling at maximum acceleration and a predicted arrival point of the dump truck 2 at predetermined time point t when traveling at maximum deceleration. In this way, even when the dump truck 2 accelerates and decelerates, an unmanned vehicle existence range ER is set in consideration of maximum acceleration and maximum deceleration.

The regions where the dump truck 2 is present when the dump truck 2 is located at the respective predicted arrival points are assumed for the tip end of the acceleration range AR and the rear end of the deceleration range BR.

The unmanned vehicle existence range estimation unit 66 may estimate an acceleration range AR in consideration of a limited traveling speed of the dump truck 2. For example, the unmanned vehicle existence range estimation unit 66 may estimate an acceleration range AR based on a state in which the accelerating dump truck 2 reaches a limited traveling speed and keeps on traveling at the limited traveling speed.

Figure 12:
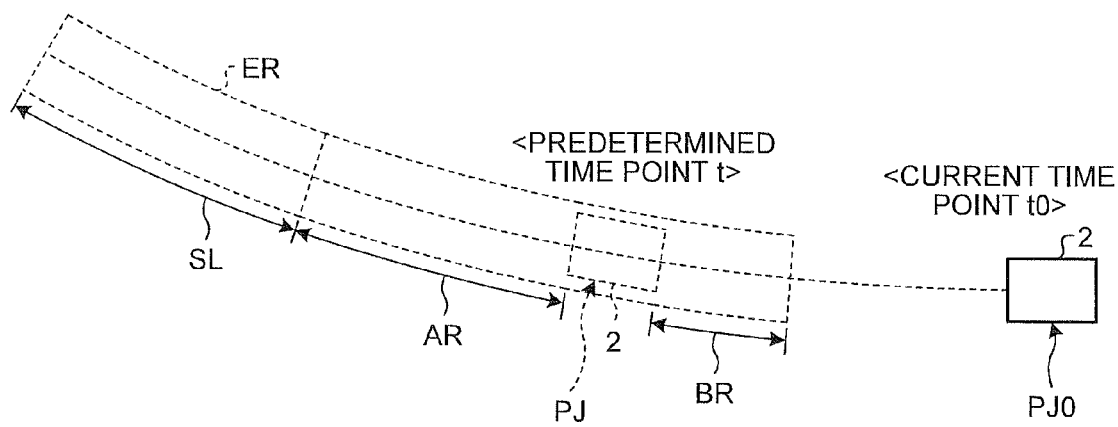
FIG. 12 is a diagram illustrating an exemplary mine management method according to the embodiment.

As illustrated in FIG. 12, the unmanned vehicle existence range ER may include a range which is extended by a predetermined distance SL in a traveling direction of the dump truck 2 from the acceleration range AR where the dump truck 2 may be present at predetermined time point t when traveling at maximum acceleration from a position where the dump truck 2 is present between current time point t0 and predetermined time point t. A length of the predetermined distance SL may be arbitrarily set. A predetermined distance SL is set so that when the manned vehicle 40 cuts in front of the dump truck 2 and hinders traveling thereof, the manned vehicle control device 60 can issue an alarm assuming a possible collision. For example, the predetermined distance SL is a distance from the manned vehicle 40 when the dump truck 2 starts an operation of avoiding a collision with the manned vehicle 40 at predetermined time point t. When the braking device 22 in the dump truck 2 is operated at predetermined time point t in order for the dump truck 2 to avoid a collision with the manned vehicle 40, a distance between the dump truck 2 and the manned vehicle 40 when the braking device 22 in the dump truck 2 is operated is set as the predetermined distance SL.

Management Method: First Embodiment

Figure 13:
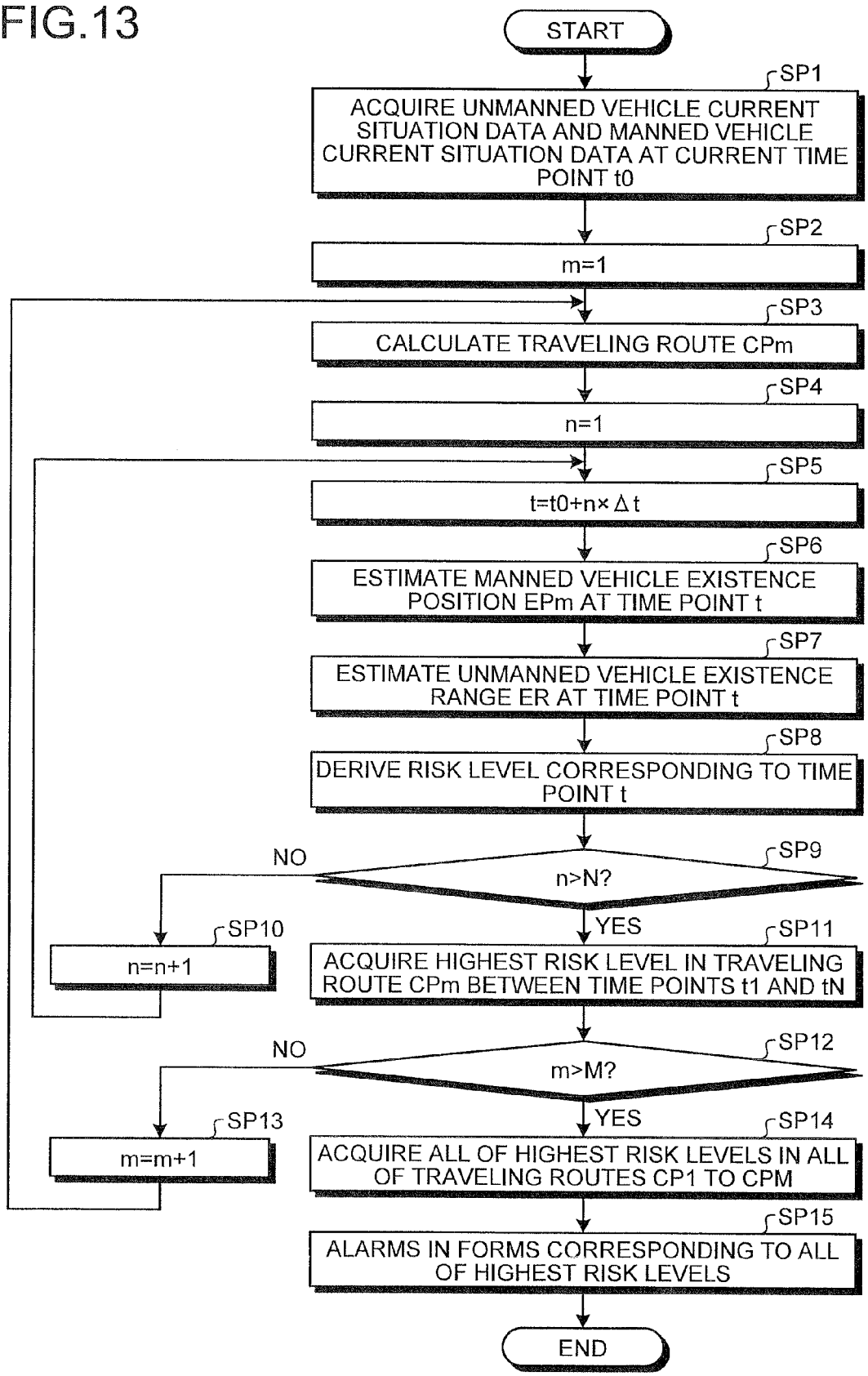
FIG. 13 is a flowchart illustrating an exemplary mine management method according to the embodiment.
Figure 14:
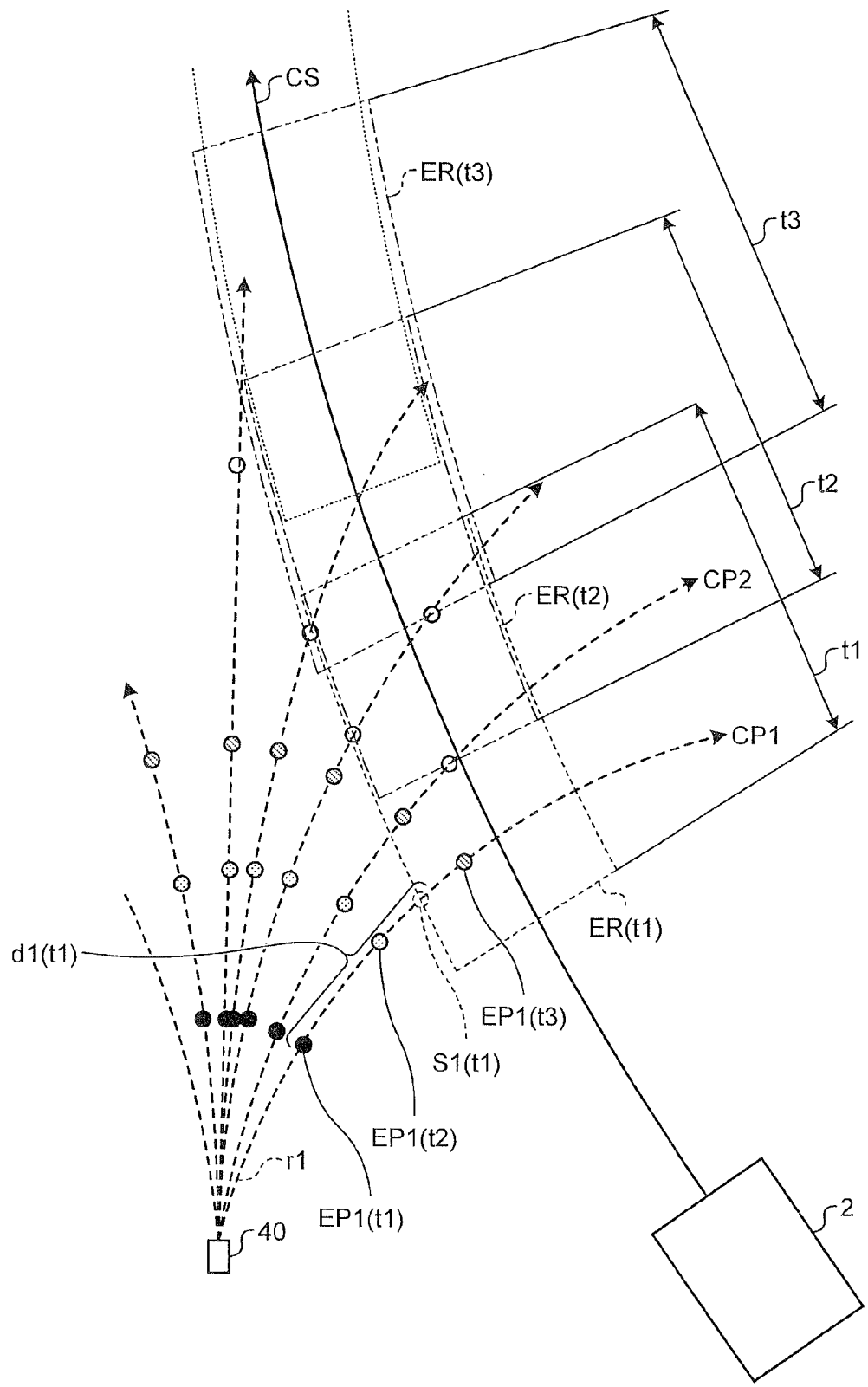
FIG. 14 is a diagram illustrating an exemplary mine management method according to the embodiment.

A mine management method according to the present embodiment will be described below by way of example. FIG. 13 is a flowchart illustrating the mine management method according to the present embodiment by way of example. FIG. 14 is a schematic diagram for explaining the mine management method according to the present embodiment by way of example.

The processings described below are performed at current time point t0. A plurality of traveling routes CP (CP1, CP2, . . . , CPM) are set at current time point t0, manned vehicle existence positions EP where the manned vehicle 40 may be present and unmanned vehicle existence ranges ER where the dump truck 2 may be present are estimated at time points t (t1, t2, t3, . . . , tN) at elapse of predetermined time after current time point t0, respectively, per traveling route CP, and risk levels indicating a possibility of collision between the manned vehicle 40 and the dump truck 2 are derived corresponding to time points t (the manned vehicle existence positions EP) per manned vehicle existence position EP where the manned vehicle 40 may be present.

The first unmanned vehicle traveling data of the dump truck 2 is generated in the first unmanned vehicle traveling data generation unit 12B in the management apparatus 10. The second unmanned vehicle traveling data of the dump truck 2 is generated in the second unmanned vehicle traveling data generation unit 30A in the unmanned vehicle control device 30. The unmanned vehicle control device 30 controls the traveling device 5 in the dump truck 2 based on the first unmanned vehicle traveling data and the second unmanned vehicle traveling data. The dump truck 2 travels in the mine based on the first unmanned vehicle traveling data including a target traveling route CS and the second unmanned vehicle traveling data including a target traveling speed. The manned vehicle 40 travels in the mine with the driving operation of the worker WM.

The manned vehicle control device 60 including the unmanned vehicle current situation data acquisition unit 61 and the manned vehicle current situation data acquisition unit 63 acquires the unmanned vehicle current situation data including a position (region) and a traveling speed of the dump truck 2 at current time point t0 and the manned vehicle current situation data indicating a position and a traveling speed of the manned vehicle 40 at current time point t0 (step SP1).

The first unmanned vehicle traveling data acquisition unit 62 acquires the first unmanned vehicle traveling data from the management apparatus 10.

A counter m is set at an initial value "1" (step SP2). The counter m is a natural number.

The manned vehicle existence position estimation unit 67 calculates a traveling route CPm when the manned vehicle 40 travels at a constant turning radius corresponding to a steering angle rm from a current position indicating a position of the manned vehicle 40 at current time point t0 (step SP3).

The manned vehicle existence position estimation unit 67 determines a steering angle rm of the traveling device 41 in a range in which the traveling device 41 in the manned vehicle 40 can steer. The center of the steerable range is in the traveling direction of the manned vehicle 40 or at a current steering angle. The manned vehicle steering angle data indicating the steering angle rm is acquired by the manned vehicle steering angle data acquisition unit 65.

A counter n is set at an initial value "1" (step SP4). The counter n is a natural number.

Predetermined time point t is then set (step SP5). Predetermined time point t is set in the following Equation (1).

$$t = t0 + n \times \Delta t \quad (1)$$

In Equation (1), t0 is current time point. n is the counter. $\Delta t$ is a preset time. $\Delta t$ may be 0.1 [seconds] or 1 [second], for example. $n \times \Delta t$ indicates an elapsed time from current time point t0. Therefore, at n=1, predetermined time point t is at elapse of $1 \times \Delta t$ [hours] from current time point t0. In the following description, it will be assumed that the counter n is set at "1" and predetermined time point t at elapse of $1 \times \Delta t$ [hours] from current time point t0 is called time point t1 as needed.

The manned vehicle current situation data at current time point t0 indicates a start point of the manned vehicle 40 in a movement between current time point t0 and time point t1.

The manned vehicle existence position estimation unit 67 estimates a manned vehicle existence position EPm(t1) indicating where the manned vehicle 40 may be present at time point t1 when the traveling device 41 in the manned vehicle 40 travels at a steering angle rm based on the manned vehicle current situation data at current time point t0 (step SP6).

Since the counter m is set at "1", a traveling route CPm is the traveling route CP1, a steering angle rm is the steering angle r1, and a manned vehicle existence position EPm is the manned vehicle existence position EP1.

The manned vehicle existence position estimation unit 67 estimates the manned vehicle existence position EP1(*t*1) at time point t1 assuming that a traveling speed of the manned vehicle 40 at current time point t0 is kept at a constant value until the manned vehicle 40 reaches the manned vehicle existence position EP1.

A relationship between the steering angle r1 of the traveling device 41 and the traveling route CP1 of the manned vehicle 40 at the steering angle r1 is stored in the storage unit 73. A relationship between the steering angle r1 of the traveling device 41 and the traveling route CP1 of the manned vehicle 40 may be a table or map data previously found by previous experiments or simulation, or may be a predefined relational expression. Thereby, the manned vehicle control device 60 can estimate the manned vehicle existence position EP1(*t*1) indicating an arrival position of the manned vehicle 40 at time point t1 when the traveling device 41 in the manned vehicle 40 travels at the steering angle r1 based on the manned vehicle current situation data at current time point t0.

The unmanned vehicle existence range estimation unit 66 estimates the unmanned vehicle existence range ER(t1) indicating a range in which the dump truck 2 may be present at time point t1 at elapse of $1 \times \Delta t$ [hours] from current time point t0 based on the unmanned vehicle current situation data at current time point t0 and the first unmanned vehicle traveling data (step SP7).

The first unmanned vehicle traveling data indicating a target traveling route CS and a limited traveling speed is generated in the first unmanned vehicle traveling data generation unit 12B and is transmitted to the manned vehicle control device 60 via the communication system 9. The unmanned vehicle current situation data at current time point t0 is transmitted to the manned vehicle control device 60 via the communication system 9. The unmanned vehicle existence range estimation unit 66 can estimate the unmanned vehicle existence range ER(t1) at time point t1 based on the unmanned vehicle current situation data at current time point t0 and the first unmanned vehicle traveling data. An unmanned vehicle existence range ER includes an absolute position and an absolute range defined on the GPS coordinate system. An unmanned vehicle existence range ER is estimated in consideration of the second unmanned vehicle traveling data including acceleration or deceleration of the dump truck 2.

A positional relationship between the manned vehicle existence position EP1(*t*1) at time point t1 estimated in the manned vehicle existence position estimation unit 67 and the unmanned vehicle existence range ER(t1) at time point t1 estimated in the unmanned vehicle existence range estimation unit 66 along the traveling route CP1 calculated in the manned vehicle existence position estimation unit 67 is as indicated in FIG. 14. A positional relationship between the manned vehicle 40 and the dump truck 2 at current time point t0 and the unmanned vehicle existence range ER(t1) is as indicated in FIG. 14. As illustrated in FIG. 14, the unmanned vehicle existence range ER(t1) is set in a substantially rectangular shape to include the target traveling route CS.

The unmanned vehicle existence range estimation unit 66 finds a virtual cross point Sm between an unmanned vehicle existence range ER and a traveling route CPm of the manned vehicle 40. The counter m is set at "1", and thus a virtual cross point Sm(t1) at time point t1 is the virtual cross point S1(*t*1).

The manned vehicle existence position EP1(*t*1) is a position of the manned vehicle 40 along the traveling route CP1 at time point t1 when the manned vehicle 40 travels along the traveling route CP1 at a constant turning radius corresponding to the steering angle r1 between the current position indicating a position of the manned vehicle 40 at current time point t0 and the virtual cross point S1(*t*1) relative to the virtual cross point S1(*t*1) set in the unmanned vehicle existence range ER(t1).

The manned vehicle existence position estimation unit 67 finds the virtual cross point S1(*t*1) assuming that a traveling speed of the manned vehicle 40 at current time point t0 is kept at a constant value until the manned vehicle 40 reaches the virtual cross point S1(*t*1). The manned vehicle 40 travels at the steering angle r1 from a current position, travels along the traveling route CP1 at a constant turning radius, passes the manned vehicle existence position EP1(*t*1) at time point t1, and reaches the virtual cross point S1(*t*1).

Then, the collision risk determination unit 69 derives a risk level indicating a possibility of collision between the manned vehicle 40 and the dump truck 2 at current time point t0 in the positional relationship between the manned vehicle 40 and the dump truck 2 at time point t1 based on an estimation result of the unmanned vehicle existence range estimation unit 66 and an estimation result of the manned vehicle existence position estimation unit 67. Specifically, the collision risk determination unit 69 derives a risk level indicating a possibility of collision with the dump truck 2 at the virtual cross point S1(t1) after the manned vehicle 40 passes the manned vehicle existence position EP1(t1) (step SP8).

According to the present embodiment, the collision risk determination unit 69 calculates, at current time point t0, a time d1(t1) required for the manned vehicle 40 to move from the manned vehicle existence position EP1(t1) at time point t1 to the unmanned vehicle existence range ER(t1). A degree of approach of the manned vehicle 40 to an unmanned vehicle existence range ER is known by the time d1. The collision risk determination unit 69 derives a risk level corresponding to time point t1 at current time point t0 based on the calculated time d1(t1), the steering angle r1 of the manned vehicle 40 when traveling along the traveling route CP1, and an elapsed time h from current time point t0. The manned vehicle existence position EP1(t1) at time point t1 is estimated in the manned vehicle existence position estimation unit 67.

The time d1(t1) is derived based on a distance between the manned vehicle existence position EP1(t1) and the virtual cross point S1(t1), and a traveling speed of the manned vehicle 40 traveling along the traveling route CP1.

In the example illustrated in FIG. 14, when the traveling device 41 in the manned vehicle 40 travels at the steering angle r1 along the traveling route CP1, the manned vehicle 40 is present at the manned vehicle existence position EP1(t1) at time point t1, and when traveling at a current traveling speed, it will reach the unmanned vehicle existence range ER(t1) in a time d1(t1). A degree of approach between the unmanned vehicle existence range ER(t1) and the manned vehicle 40 corresponding to time point t1 is known by the time d1(t1).

Assuming a time required for the manned vehicle 40 to move from a manned vehicle existence position EP(t) to an unmanned vehicle existence range ER(t) corresponding to time point t as an approach degree time d and an elapsed time from current time point t0 as an elapsed hour h, a risk level is a function of the approach degree time d, the steering angle r, and the elapsed hour h. Assuming a risk level corresponding to time point t1 at current time point t0 for a traveling route CPm as Cm(t1), the risk level Cm(t1) can be expressed in Equation (2A).

$$Cm(t1) = g(rm) \times f(d1) \times h(t1) \quad (2A)$$

$$Cm = g(rm) \times \max_{n=1\sim N} \{f(dn) \times h(tn)\} \quad (2B)$$

$$C = \max_{m=1\sim M} Cm \quad (2C)$$

In Equation (2A), as the approach degree time d is shorter, the risk level is higher, and thus the function f(d1) is a decreasing function. As the steering angle rm of the traveling device 41 in the manned vehicle 40 from current time point t0 to time point t1 is closer to zero, or when the manned vehicle 40 is closer to a straight-ahead driving state, the estimation is probable, and thus the function g(rm) is a function which takes a larger value as the steering angle rm is closer to zero. As the elapsed hour h is longer, a collision is less likely, and thus h(t1) is a decreasing function.

In this way, the collision risk determination unit 69 determines, based on Equation (2A), that as the steering angle rm of the traveling device 41 in the manned vehicle 40 from current time point t0 to time point tn is closer to zero (as the manned vehicle 40 is closer to a straight-ahead driving state), the risk level Cm(tn) is higher.

There has been described above the procedure of deriving the risk level C1(t1) corresponding to time point t1 at current time point t0 when the manned vehicle 40 travels along the traveling route CP1. According to the present embodiment, the above processings are repeatedly performed until the counter n reaches a predefined constant N. The constant N is a natural number more than 1. The constant N may be 5 or 10, for example. That is, after the processings in step SP1 to SP8 are terminated, the manned vehicle control device 60 determines whether the counter n is larger than the constant N (step SP9).

In step SP9, when it is determined that the counter n is not larger than the constant N (step SP9: No), the manned vehicle control device 60 adds 1 to the counter n (step SP10). That is, the counter n is set at "2." The counter n is set at "2", and then the processing in step SP5 is performed.

At n=2, predetermined time point t is at elapse of time (2×Δt) from current time point t0. In the following description, predetermined time point t, when n is set at "2" and time (2×Δt) elapses from current time point t0, will be called time point t2 as needed.

Step SP6 to step SP8 are performed at time point t2. According to the present embodiment, a relationship among the traveling route CP1 calculated in the manned vehicle existence position estimation unit 67, the manned vehicle existence position EP1(t2) at time point t2 estimated in the manned vehicle existence position estimation unit 67, and the unmanned vehicle existence range ER(t2) at time point t2 estimated in the unmanned vehicle existence range estimation unit 66 is as indicated in FIG. 14.

That is, at time point t2, the unmanned vehicle existence range ER(t2) passes over the traveling route CP1 and the virtual cross point S1(t2) cannot be found, and thus the risk level C1(t2) is calculated assuming the time d1(t2) as infinite.

After the processings in step SP5 to step SP8 are repeatedly performed, n is set at "N", and step SP5 to step SP8 are performed at time point tN at elapse of time "N×Δt" from current time point t0, when it is determined in step SP9 that the counter n is larger than the constant N (step SP9: Yes), the manned vehicle control device 60 acquires a highest risk level among the risk levels derived between time point t1 and time point tN when the manned vehicle 40 travels along the traveling route CP1 (step SP11).

As described above, a risk level C1(t1) corresponding to time point t1, a risk level C1(t2) corresponding to time point t2, a risk level C1(t2) corresponding to time point t3, . . . , and a risk level C1(tN) corresponding to time point tN are derived at current time point t0 when the manned vehicle 40 travels along the traveling route CP1. As the time d1(t) is shorter, the risk level is higher. The highest risk level along the route CPm(CP1) at current time point t0 is expressed in Equation (2B).

There has been described above the procedure of deriving the risk levels C1(t) corresponding to each time point t (t1 to tN) when the manned vehicle 40 travels along the traveling route CP1 corresponding to the steering angle r1 and acquiring the highest risk level C1 among the risk levels C1($t$).

According to the present embodiment, the processings in step SP3 to step SP11 are repeatedly performed until the counter m reaches a predefined constant M. The constant M is a natural number more than 1. The constant M may be 5 or 10, for example. That is, after the processings in step SP3 to step SP11 are terminated, the manned vehicle control device 60 determines whether the counter m is larger than the constant M (step SP12).

When it is determined in step SP12 that the counter m is not larger than the constant M (step SP12: No), the manned vehicle control device 60 adds 1 to the counter m (step SP13). That is, the counter m is set at "2." After the counter m is set at "2", the processings in step SP3 to step SP11 are performed.

That is, the manned vehicle control device 60 derives the risk levels C2($t$) corresponding to each time point t (t1 to tN) when the manned vehicle 40 travels along the traveling route CP2 corresponding to the steering angle r2, and acquires the highest risk level C2 among the risk levels C2($t$).

The manned vehicle control device 60 derives the risk levels C3($t$) corresponding to each time point t (t1 to tN) when the manned vehicle 40 travels along the traveling route CP3 corresponding to the steering angle r3, and acquires the highest risk level C3 among the risk levels C3($t$).

Similarly, the manned vehicle control device 60 derives the risk levels CM(t) corresponding to each time point t (t1 to tN) when the manned vehicle 40 travels along the traveling route CP2 corresponding to the steering angle rM, and acquires the highest risk level CM among the risk levels CM(t).

When it is determined in step SP12 that the counter m is larger than the constant M (step SP12: Yes), the manned vehicle control device 60 acquires the highest risk level C among all the highest risk levels C1, C2, . . . , CM derived for the traveling route CP1 to the traveling route CPM of the manned vehicle 40 (step SP14). The highest risk level C is a risk level for the traveling route CPm and time point tn when the approach degree time d indicates a maximum value. The highest risk level C at current time point t0 is expressed in Equation (2C).

As described above, when the risk level Cm(tn) is calculated at current time point t0, a time actually elapses, and the manned vehicle 40 travels, a plurality of virtual turning routes CPm are set (scattered) at the traveling positions, and a degree of approach is found at a position after a predetermined time. The parameter of the turning radius r is added to the approach degree time d and the elapsed hour h, and Equation (2A), Equation (2B), and Equation (2C) are obtained. For example, at time point t3, even if the manned vehicle 40 remarkably approaches an unmanned vehicle existence range ER, not only the approach degree time d but also the elapsed hour h is required to calculate a risk level due to an elapsed time from current time point t0 to time point t3. Of course, the turning radius r is also more probable in straight-ahead driving and is less probable in quick turning, and thus the turning radius r is also required to calculate a risk level.

If a virtual cross point Sm is determined on the side of an unmanned vehicle existence range ER, d+h is constant, while if a virtual cross point Sm crosses with the rear end of an unmanned vehicle existence range ER, the approach degree time d is large for an unmanned vehicle with a large vehicle width like the dump truck 2 traveling in the mine or the virtual cross point Sm to be considered changes due to the elapsed hour h, and thus a risk level is found per elapsed time at a turning radius r (steering angle), thereby finely calculating the risk levels.

The alarm device control unit 70 outputs a control signal for controlling the alarm device 48 for issuing an alarm to the manned vehicle 40 based on a risk level derived in the collision risk determination unit 69. The alarm device control unit 70 outputs a control signal such that the alarm device 48 issues an alarm in a form according to a highest risk level derived in step SP14 (step SP15).

The alarm device control unit 70 outputs a control signal such that the alarm device 48 issues an alarm in a different form based on a derived highest risk level.

For example, when it is determined in step SP14 that the derived highest risk level is low, the alarm device control unit 70 outputs a control signal to the alarm device 48 such that the alarm device 48 issues an alarm in a first form.

When it is determined in step SP14 that the derived highest risk level is middle, the alarm device control unit 70 outputs a control signal to the alarm device 48 such that the alarm device 48 issues an alarm in a second form different from the first form.

When it is determined in step SP14 that the derived highest risk level is high, the alarm device control unit 70 outputs a control signal to the alarm device 48 such that the alarm device 48 issues an alarm in a third form different from the first form and the second form.

The alarm device 48 issues an alarm to the operator WM of the manned vehicle 40 based on a control signal from the alarm device control unit 70. When the risk level is low, the alarm device control unit 70 causes the speech output device 48B to issue an alarm sound at first volume in the first form. When the risk level is middle, the alarm device control unit 70 causes the speech output device 48B to issue an alarm sound at second volume higher than the first volume in the second form. When the risk level is high, the alarm device control unit 70 causes the speech output device 48B to issue an alarm sound at third volume higher than the second volume in the third form.

When the risk level is low, the alarm device control unit 70 may cause the display device 48A to display characters or image indicating that "risk level is low" thereon in the first form. When the risk level is middle, the alarm device control unit 70 may cause the display device 48A to display characters or image indicating that "risk level is middle" thereon in the second form. The alarm device control unit 70 may cause the display device 48A to display characters or image indicating that "risk level is high" thereon in the third form.

When the risk level is low, the alarm device control unit 70 may cause the speech output device 48B to generate a speech indicating that "risk level is low" in the first form. When the risk level is middle, the alarm device control unit 70 may cause the speech output device 48B to generate a speech indicating that "risk level is middle" in the second form. When the risk level is high, the alarm device control unit 70 may cause the speech output device 48B to generate a speech indicating that "risk level is high" in the third form.

As described above, according to the present embodiment, an unmanned vehicle existence range ER(t) at predetermined time point t (t1, t2, . . . , tN) is estimated based on the unmanned vehicle current situation data and the unmanned vehicle traveling data at current time point t0. A plurality of manned vehicle existence positions EP(t) at predetermined time points t (t1, t2, . . . , tN) are estimated based on the manned vehicle position data at current time point t0 and the manned vehicle speed data at current time point t0. According to the present embodiment, a plurality of traveling routes CP (CP1, CP2, . . . , CPM) of the manned vehicle 40 are estimated from current time point t0 to predetermined time point t (t1, t2, . . . , tN) when the traveling device 41 in the manned vehicle 40 travels at different steering angles r (r1, r2, . . . , rM) based on the manned vehicle position data at current time point t0 and the manned vehicle speed data at current time point t0. Thereby, the collision risk determination unit 69 can estimate a positional relationship between the manned vehicle 40 and the dump truck 2 at predetermined time point t (t1, t2, . . . , tN), and can determine a risk level indicating a possibility of collision between the manned vehicle 40 and the dump truck 2 per manned vehicle existence positions EP.

The alarm device control unit 70 outputs a control signal for controlling the alarm device 48 for issuing an alarm to the manned vehicle 40 based on a determination result of the collision risk determination unit 69, and thus can cause the alarm device 48 to issue a proper alarm according to a collision risk level. A necessary alarm is appropriately issued and an unwanted alarm is prevented from being issued, and thus a reduction in productivity of the dump truck 2 is restricted, and a collision between the dump truck 2 and the manned vehicle 40 can be avoided.

The alarm device control unit 70 outputs a control signal such that the alarm device 48 issues an alarm in a different form based on a risk level indicating a collision possibility level determined per manned vehicle existence positions EP. Thereby, when the worker WM of the manned vehicle 40 continues a driving operation including a steering angle of the manned vehicle 40 at current time point t0, he/she can determine whether the manned vehicle 40 is likely to travel toward the manned vehicle existence position EPN and collide with the dump truck 2, whether the manned vehicle 40 is less likely to travel toward the manned vehicle existence position EP2 and collide with the dump truck 2 but traverses the target traveling route CS ahead of the dump truck 2, or whether the manned vehicle 40 does not travel toward the manned vehicle existence position EP1 and does not collide with the dump truck 2, but the target traveling route CS is in the non-entry region BP. Therefore, the worker WM of the manned vehicle 40 can perform any one of a driving operation of avoiding a collision with the dump truck 2, a driving operation of not traversing the target traveling route CS ahead of the dump truck 2, and a driving operation of preventing the target traveling route CS from being in the non-entry region BP based on a form of alarm of the alarm device 48. As described above, when the manned vehicle 40 traverses the target traveling route CS ahead of the dump truck 2 or the target traveling route CS enters the non-entry region BP, the dump truck 2 is stopped, is decelerated, and is subjected to route change, and thus the dump truck 2 is limited in its traveling. Consequently, productivity of the dump truck 2 lowers and consequently productivity of the mine lowers. The alarm device 48 issues an alarm in a different form based on a collision possibility level, and thus the operator WM of the manned vehicle 40 can perform not only the driving operation of avoiding a collision with the dump truck 2 but also a driving operation of restricting a reduction in productivity.

According to the present embodiment, the alarm device control unit 70 outputs a control signal based on the manned vehicle steering angle data acquired by the manned vehicle steering angle data acquisition unit 67 and the manned vehicle existence position EP. Thereby, when the worker WM continues a driving operation at current time point t0, the alarm device control unit 70 can notify, to the worker WM, which manned vehicle existence position EP among the manned vehicle existence positions EP the manned vehicle 40 travels toward via an alarm. Thereby, the worker WM can avoid a collision with the dump truck 2 and perform a proper driving operation of restricting a reduction in productivity.

According to the present embodiment, when the dump truck 2 and the manned vehicle 40 are in a predetermined positional relationship, the alarm device control unit 70 outputs a control signal. For example, when the worker WM maintains or inspects the dump truck 2, the manned vehicle 40 needs to be close to the dump truck 2. In this case, the worker WM operates the input device 49 to cause the cancellation unit 71 to generate a cancellation signal. A cancellation signal is generated so that a control signal output from the alarm device control unit 70 is canceled. Thereby, even if the manned vehicle 40 is made close to the dump truck 2, the alarm device 48 is restricted from operating. Therefore, an alarm troubling the worker WM is restricted from being issued. The same applies to the following embodiment.

The present embodiment assumes that the alarm device 48 in the manned vehicle 40 is operated in response to a control signal output from the alarm device control unit 70. The dump truck 2 may issue an alarm to the worker WM of the manned vehicle 40 in response to a control signal output from the alarm device control unit 70. For example, a control signal from the alarm device control unit 70 is transmitted to the dump truck 2 via the communication system 9. The dump truck 2 may blink the headlights 31 or issue an alarm sound from the horn 32 thereby to issue an alarm to the worker WM of the manned vehicle 40. The same applies to the following embodiment.

There has been described in the present embodiment the risk level derivation method when one dump truck 2 approaches the manned vehicle 40. A plurality of dump trucks 2 operate in the mine. The collision risk determination unit 69 in the manned vehicle 40 can derive a highest risk level for each of the dump trucks 2. The same applies to the following embodiment.

Management Method: Second Embodiment

A second embodiment of the mine management method will be described below. In the following description, the same or like components as those in the above embodiment are denoted with the same reference numerals, and the description thereof will be simplified or omitted.

The present embodiment different from the first embodiment is characterized in that when calculating a risk level Cm assuming a plurality of traveling routes CPm, the manned vehicle control device 60 changes a weight of calculating a risk level Cm for a steering angle rm based on a traveling speed of the manned vehicle 40 at current time point t0.

According to the first embodiment, the function g(rm) of a risk level Cm relative to a steering angle rm takes a larger value as the manned vehicle 40 is closer to a straight-ahead driving state, and does not have a relationship with a traveling speed of the manned vehicle 40. According to the present embodiment, as a traveling speed of the manned vehicle 40 is higher, a weight of a risk level Cm is smaller when a steering angle rm is larger.

Figure 15:
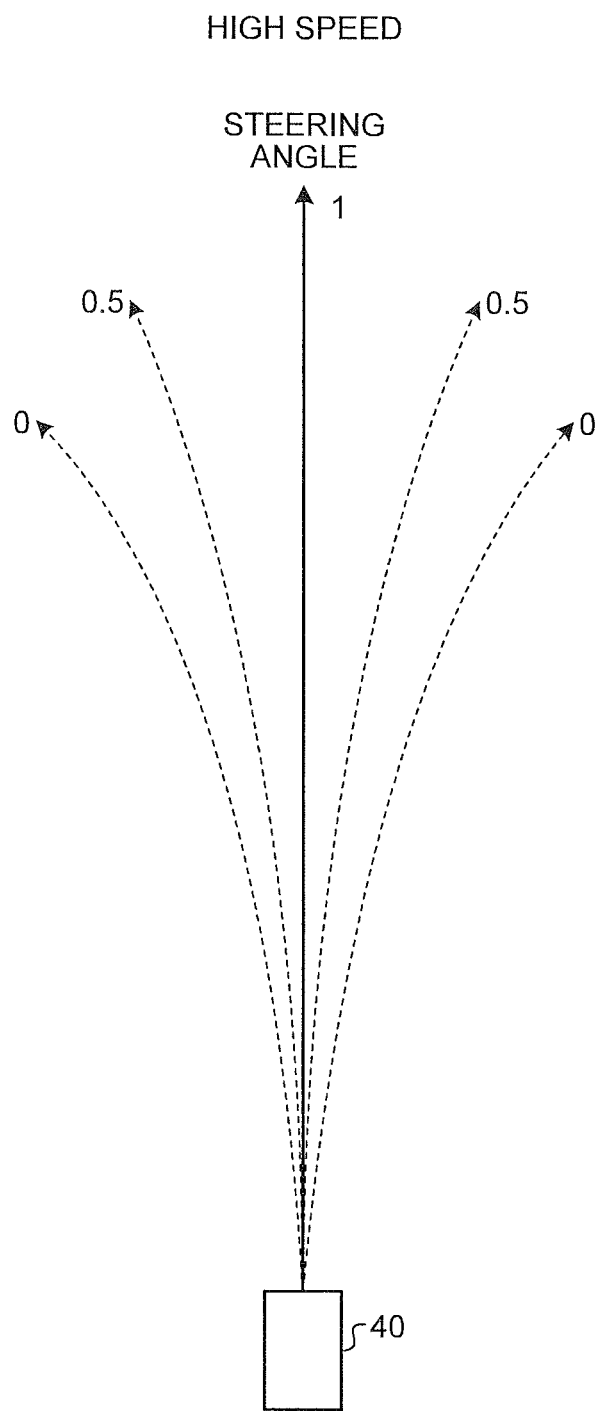
FIG. 15 is a diagram illustrating an exemplary mine management method according to the embodiment.

FIG. 15 and FIG. 16 are the schematic diagrams illustrating a relationship between a steering angle rm and a weight according to the present embodiment. As illustrated in FIG. 15, when the manned vehicle 40 travels at a high speed, a traveling direction of the traveling device 41 in the manned vehicle 40 is less likely to be changed. In other words, when the manned vehicle 40 travels at a high speed, the manned vehicle 40 is likely to travel in a straight-ahead state, and the steering wheel operation unit 45A of the manned vehicle 40 is less likely to be largely operated. As illustrated in FIG. 16, when the manned vehicle 40 travels at a low speed, a traveling direction of the traveling device 41 in the manned vehicle 40 is more likely to be changed than when traveling at a high speed. In other words, when the manned vehicle 40 travels at a low speed, the manned vehicle 40 is likely to travel in a non-straight-ahead state, and the steering wheel operation unit 45A of the manned vehicle 40 is more likely to be largely operated than when traveling at a high speed.

As illustrated in FIG. 15 and FIG. 16, a weight of calculating a risk level based on the changeable amount of a steering angle rm is changed based on a traveling speed of the manned vehicle 40. The numerical values of "0", "0.5" and "1" indicated in FIG. 15 and FIG. 16 indicate a weight of calculating a risk level depending on a steering angle.

As described above, the collision risk determination unit 69 can set a weight of a risk level Cm relative to the change amount of a steering angle rm based on the manned vehicle speed data at current time point t0.

The above embodiment assumes that the function g(rm) takes a larger value as a steering angle rm is closer to zero. A risk level Cm may be calculated by use of a function which takes a larger value as a steering angle is closer to the steering angle rm at current time point t0. That is, the collision risk determination unit 69 may determine that a risk level Cm(tn) is higher as a steering angle rm of the traveling device 41 in the manned vehicle 40 between current time point t0 and time point tn is closer to the steering angle rm at current time point t0.

The above embodiment assumes that the unmanned vehicle existence range estimation unit 66, the manned vehicle existence position estimation unit 67, and the collision risk determination unit 69 are provided in the manned vehicle 40. At least some of the functions of the manned vehicle control device 60 such as the unmanned vehicle existence range estimation unit 66, the manned vehicle existence position estimation unit 67 and the collision risk determination unit 69 may be provided in the management apparatus 10. The management system 1 has the communication system 9, and thus various items of data are communicable between the management apparatus 10, the dump trucks 2, and the manned vehicle 40. For example, the collision risk determination unit 69 provided in the management apparatus 10 may determine a possibility of collision between the manned vehicle 40 and the dump truck 2 based on an estimation result of the unmanned vehicle existence range estimation unit 66 provided in the management apparatus 10 and an estimation result of the manned vehicle existence position estimation unit 67 provided in the management apparatus 10. The alarm device control unit 70 provided in the management apparatus 10 may transmit a control signal to the alarm device 48 in the manned vehicle 40 via the communication system 9.

The components according to each of the embodiments include ones easily assumed by those skilled in the art, substantially the same ones, or ones in the equivalent range. The components according to each of the embodiments may be combined as needed. Some of the components may not be used.

REFERENCE SIGNS LIST

1 MANAGEMENT SYSTEM
2 DUMP TRUCK (UNMANNED VEHICLE)
3 VEHICLE
4 VESSEL
5 TRAVELING DEVICE
6 VEHICLE MAIN BODY
7 POWER GENERATION DEVICE
8 CONTROL CENTER
9 COMMUNICATION SYSTEM
10 MANAGEMENT APPARATUS
11 COMPUTER SYSTEM
12 PROCESSING DEVICE
12A DATA PROCESSING UNIT
12B UNMANNED VEHICLE TRAVELING DATA GENERATION UNIT
12C NON-ENTRY REGION SETTING UNIT
13 STORAGE DEVICE
13B DATABASE
15 I/O UNIT
16 DISPLAY DEVICE
17 INPUT DEVICE
18 WIRELESS COMMUNICATION DEVICE
20 WHEEL
21 AXLE
22 BRAKING DEVICE
23 STEERING DEVICE
24 NON-CONTACT SENSOR
25 STORAGE DEVICE
25B DATABASE
26 GYRO SENSOR
27 SPEED SENSOR
28 POSITION SENSOR
28A ANTENNA
29 WIRELESS COMMUNICATION DEVICE
29A ANTENNA
30 UNMANNED VEHICLE CONTROL DEVICE
31 HEADLIGHT
32 HORN
40 MANNED VEHICLE
41 TRAVELING DEVICE
42 WHEEL
43 POWER GENERATION DEVICE
43A ACCELERATOR OPERATION UNIT
44 BRAKING DEVICE
44A BRAKE OPERATION UNIT
45 STEERING DEVICE
45A STEERING WHEEL OPERATION UNIT
46 SPEED SENSOR
46 STEERING ANGLE SENSOR
47 ALARM DEVICE
48A DISPLAY DEVICE
48B SPEECH OUTPUT DEVICE
49 INPUT DEVICE
50 VEHICLE MAIN BODY
51 POSITION SENSOR
51A ANTENNA
52 WIRELESS COMMUNICATION DEVICE
52A ANTENNA
60 MANNED VEHICLE CONTROL DEVICE
61 UNMANNED VEHICLE CURRENT SITUATION DATA ACQUISITION UNIT
62 UNMANNED VEHICLE TRAVELING DATA ACQUISITION UNIT
63 MANNED VEHICLE CURRENT SITUATION DATA ACQUISITION UNIT
65 MANNED VEHICLE STEERING ANGLE DATA ACQUISITION UNIT
66 UNMANNED VEHICLE EXISTENCE RANGE ESTIMATION UNIT

67 MANNED VEHICLE EXISTENCE POSITION ESTIMATION UNIT
69 COLLISION RISK DETERMINATION UNIT
70 ALARM DEVICE CONTROL UNIT
71 CANCELLATION UNIT
72 UNMANNED VEHICLE CURRENT SITUATION DATA OUTPUT UNIT
73 STORAGE UNIT
AP TRAVELING PERMITTED REGION
BP NO-ENTRY REGION
CS TARGET TRAVELING ROUTE
CP TRAVELING ROUTE
DPA UNLOADING SITE
EP MANNED VEHICLE EXISTENCE POSITION
ER UNMANNED VEHICLE EXISTENCE RANGE
HL TRAVELING COURSE
LM LOADING MACHINE
LPA LOADING SITE
PI POINT
ST GPS SATELLITE
WM WORKER

The invention claimed is:

1. A mine management system where an unmanned vehicle and a manned vehicle operate, the system comprising:
an unmanned vehicle traveling data generation unit configured to generate unmanned vehicle traveling data including a target traveling route of the unmanned vehicle in the mine;
an unmanned vehicle current situation data acquisition unit configured to acquire unmanned vehicle current situation data including unmanned vehicle region data at first time point and unmanned vehicle traveling speed data at the first time point;
a manned vehicle current situation data acquisition unit configured to acquire manned vehicle current situation data including manned vehicle position data at the first time point, manned vehicle traveling speed data at the first time point, and a plurality of different steering angles;
an unmanned vehicle existence range estimation unit configured to estimate a range in which the unmanned vehicle may be present at second time point at elapse of predetermined time after the first time point based on the unmanned vehicle current situation data;
a manned vehicle existence position estimation unit configured to estimate a plurality of positions where the manned vehicle may be present at the second time point based on the manned vehicle current situation data; and
a collision risk determination unit configured to derive a risk level indicating a possibility of collision between the manned vehicle and the unmanned vehicle corresponding to the second time point at the first time point per position where the manned vehicle may be present based on an estimation result of the unmanned vehicle existence range estimation unit and an estimation result of the manned vehicle existence position estimation unit, wherein
the collision risk determination unit determines that a risk level is higher as a steering angle of a traveling device in the manned vehicle is closer to zero between the first time point and the second time point.

2. The mine management system according to claim 1, wherein the collision risk determination unit derives a highest risk level corresponding to the second time point at which the risk level is the highest among a plurality of the manned vehicle existence positions at the second time point.

3. The mine management system according to claim 2, wherein the second time point includes a plurality of time points at different elapse of time from the first time point.

4. The mine management system according to claim 1, comprising
an alarm device control unit configured to output the control signal such that an alarm device issues an alarm in a different form based on the risk level.

5. The mine management system according to claim 1, wherein the collision risk determination unit sets a weight of a risk level relative to a changed amount of the steering angle based on the manned vehicle traveling speed data at the first time point.

6. The mine management system according to claim 1, wherein the unmanned vehicle existence range includes a range which is extended by a predetermined distance in a traveling direction of the unmanned vehicle from a range in which the unmanned vehicle may be present at the second time point when traveling at the maximum acceleration from a position where the unmanned vehicle is present between the first time point and the second time point.

7. The mine management system according to claim 6, wherein the predetermined distance includes a distance from the manned vehicle when the unmanned vehicle starts an operation of avoiding a collision with the manned vehicle at the second time point.

8. The mine management system according to claim 1, comprising
a cancellation unit configured to generate a cancellation signal for canceling a control signal output from the alarm device control unit.

9. The mine management system according to claim 1, comprising:
a speed sensor provided in the manned vehicle and configured to detect a traveling speed of the traveling device in the manned vehicle;
a steering angle sensor provided in the manned vehicle and configured to detect a steering angle of the traveling device in the manned vehicle; and
a manned vehicle steering angle data acquisition unit configured to acquire manned vehicle steering angle data from the steering angle sensor,
wherein the manned vehicle current situation data acquisition unit acquires the manned vehicle traveling speed data from the speed sensor, and
the collision risk determination unit is provided in the manned vehicle.

10. A mine management system where an unmanned vehicle and a manned vehicle operate, the system comprising:
an unmanned vehicle traveling data generation unit configured to generate unmanned vehicle traveling data including a target traveling route of the unmanned vehicle in the mine;
an unmanned vehicle current situation data acquisition unit configured to acquire unmanned vehicle current situation data including unmanned vehicle region data at first time point and unmanned vehicle traveling speed data at the first time point;
a manned vehicle current situation data acquisition unit configured to acquire manned vehicle current situation data including manned vehicle position data at the first time point, manned vehicle traveling speed data at the first time point, and a plurality of different steering angles;

an unmanned vehicle existence range estimation unit configured to estimate a range in which the unmanned vehicle may be present at second time point at elapse of predetermined time after the first time point based on the unmanned vehicle current situation data;

a manned vehicle existence position estimation unit configured to estimate a plurality of positions where the manned vehicle may be present at the second time point based on the manned vehicle current situation data; and a collision risk determination unit configured to derive a risk level indicating a possibility of collision between the manned vehicle and the unmanned vehicle corresponding to the second time point at the first time point per position where the manned vehicle may be present based on an estimation result of the unmanned vehicle existence range estimation unit and an estimation result of the manned vehicle existence position estimation unit, wherein the collision risk determination unit determines that a risk level is higher as a steering angle of a traveling device in the manned vehicle between the first time point and the second time point is closer to a steering angle at the first time point.

11. The mine management system according to claim 10, wherein the collision risk determination unit derives a highest risk level corresponding to the second time point at which the risk level is the highest among a plurality of the manned vehicle existence positions at the second time point.

12. The mine management system according to claim 11, wherein the second time point includes a plurality of time points at different elapse of time from the first time point.

13. The mine management system according to claim 10, comprising an alarm device control unit configured to output the control signal such that an alarm device issues an alarm in a different form based on the risk level.

14. The mine management system according to claim 10, wherein the unmanned vehicle existence range includes a range which is extended by a predetermined distance in a traveling direction of the unmanned vehicle from a range in which the unmanned vehicle may be present at the second time point when traveling at the maximum acceleration from a position where the unmanned vehicle is present between the first time point and the second time point.

15. The mine management system according to claim 14, wherein the predetermined distance includes a distance from the manned vehicle when the unmanned vehicle starts an operation of avoiding a collision with the manned vehicle at the second time point.

16. The mine management system according to claim 10, comprising a cancellation unit configured to generate a cancellation signal for canceling a control signal output from the alarm device control unit.

17. The mine management system according to claim 10, comprising:

a speed sensor provided in the manned vehicle and configured to detect a traveling speed of the traveling device in the manned vehicle;

a steering angle sensor provided in the manned vehicle and configured to detect a steering angle of the traveling device in the manned vehicle; and a manned vehicle steering angle data acquisition unit configured to acquire manned vehicle steering angle data from the steering angle sensor, wherein the manned vehicle current situation data acquisition unit acquires the manned vehicle traveling speed data from the speed sensor, and the collision risk determination unit is provided in the manned vehicle.

18. The mine management system according to claim 10, wherein the collision risk determination unit sets a weight of a risk level relative to a changed amount of the steering angle based on the manned vehicle traveling speed data at the first time point.

* * * * *